United States Patent
Mukai et al.

(10) Patent No.: US 10,851,180 B2
(45) Date of Patent: Dec. 1, 2020

(54) POLYMER MATERIAL, FILM, CIRCULAR POLARIZING PLATE, IMAGE DISPLAY APPARATUS, AND MANUFACTURING METHOD FOR FILM

(71) Applicant: KANEKA CORPORATION, Osaka (JP)

(72) Inventors: Ryutaro Mukai, Settsu (JP); Hiroto Koma, Settsu (JP); Takahiro Yasumoto, Settsu (JP); Katsuya Fujisawa, Settsu (JP); Tomohiro Abo, Otsu (JP)

(73) Assignee: KANEKA CORPORATION, Osaka (JP)

( * ) Notice: Subject to any disclaimer, the term of this patent is extended or adjusted under 35 U.S.C. 154(b) by 44 days.

(21) Appl. No.: 15/766,265

(22) PCT Filed: Oct. 6, 2016

(86) PCT No.: PCT/JP2016/079805
§ 371 (c)(1),
(2) Date: Apr. 5, 2018

(87) PCT Pub. No.: WO2017/061548
PCT Pub. Date: Apr. 13, 2017

(65) Prior Publication Data
US 2018/0282438 A1    Oct. 4, 2018

(30) Foreign Application Priority Data
Oct. 6, 2015   (JP) ................................ 2015-198333

(51) Int. Cl.
| | | |
|---|---|---|
| *C08B 15/05* | (2006.01) | |
| *C08J 5/18* | (2006.01) | |
| *B29C 55/06* | (2006.01) | |
| *C08B 13/00* | (2006.01) | |
| *B29C 55/00* | (2006.01) | |
| *G02B 5/30* | (2006.01) | |
| *C08B 3/08* | (2006.01) | |
| *B29K 1/00* | (2006.01) | |
| *B29L 31/34* | (2006.01) | |
| *B29L 11/00* | (2006.01) | |

(52) U.S. Cl.
CPC ............ *C08B 15/05* (2013.01); *B29C 55/005* (2013.01); *B29C 55/06* (2013.01); *C08B 3/08* (2013.01); *C08B 13/00* (2013.01); *C08J 5/18* (2013.01); *G02B 5/3033* (2013.01); *G02B 5/3083* (2013.01); *B29K 2001/08* (2013.01); *B29L 2011/0066* (2013.01); *B29L 2031/3475* (2013.01); *C08J 2301/10* (2013.01); *C08J 2301/26* (2013.01); *C08J 2301/32* (2013.01); *C08J 2401/10* (2013.01)

(58) Field of Classification Search
CPC ... B29C 55/005; B29C 55/06; B29K 2001/08; B29L 2011/0066; B29L 2031/3475; C08B 3/08; C08B 13/00; C08B 15/05; C08J 5/18; C08J 2301/10; C08J 2301/26; C08J 2301/32; C08J 2401/10; G02B 5/3033; G02B 5/3083
See application file for complete search history.

(56) References Cited

U.S. PATENT DOCUMENTS

| 5,410,037 A | 4/1995 | Wagner et al. |
|---|---|---|
| 2007/0009674 A1 | 1/2007 | Okubo et al. |
| 2008/0107829 A1 | 5/2008 | Oya et al. |
| 2009/0122237 A1 | 5/2009 | Fukagawa et al. |
| 2015/0004333 A1 | 1/2015 | Kim et al. |
| 2016/0274286 A1 | 9/2016 | Mukai et al. |

FOREIGN PATENT DOCUMENTS

| CN | 101300307 A | 11/2008 |
|---|---|---|
| JP | 61-249523 A | 11/1986 |
| JP | 6-340687 A | 12/1994 |
| JP | 7-268001 A | 10/1995 |
| JP | 2007-121351 A | 5/2007 |
| JP | 2008-95026 A | 4/2008 |
| JP | 2009-132764 A | 6/2009 |
| JP | 2009-221290 A | 10/2009 |
| JP | 2015-505377 A | 2/2015 |
| WO | WO 2004/107297 A1 | 12/2004 |
| WO | WO 2008/143322 A1 | 11/2008 |
| WO | WO 2015/060241 A1 | 4/2015 |

OTHER PUBLICATIONS

Combined Chinese Office Action and Search Report dated Dec. 19, 2019, in Patent Application No. 201680055577.X, 23 pages (with English translation).
International Search Report dated Dec. 6, 2016 in PCT/JP2016/079805.
International Preliminary Report on Patentability and Written Opinion dated Apr. 19, 2018 in PCT/JP2016/079805.
W. Mormann, et al., "Selectivity in the acylation of partially silylated hydroxy polymers—a study with trimethylsilyl cellulose and model compounds", Acta Polym., 1999, vol. 50, No. 1, pp. 20-27.
Fareha Zafar Khan, et al., "Synthesis, Characterization, and Gas Permeation Properties of Silylated Derivatives of Ethyl Cellulose", Macromolecules, 2006, vol. 39, No. 18, pp. 6025-6030.

(Continued)

*Primary Examiner* — Jonathan S Lau
(74) *Attorney, Agent, or Firm* — Oblon, McClelland, Maier & Neustadt, L.L.P.

(57) ABSTRACT

Provided is a polymer material containing at least one kind of a cellulose derivative having (a) an organosilyl group (the organosilyl group having a first aliphatic group, an unsaturated aliphatic group, or an aromatic group), and (b) an acyl group or a second aliphatic group.

20 Claims, No Drawings

(56) References Cited

OTHER PUBLICATIONS

Ryuhei Morita, et al., "Silylation of acetyl cellulose and gas permeability of formed polymer membrane", Polymer Preprints, Japan, 2006, vol. 55, No. 1, p. 1573(2Pa119) and cover sheet (with English Abstract and English translation).

Armin Stein, et al., "Syntheses of cellulose derivatives via 0-triorganosilyl celluloses, 1", Makromol. Chem., Rapid Commun., 1988, vol. 9, No. 8, pp. 569-573.

Office Action dated Apr. 28, 2020 in corresponding Japanese Patent Application No. 2017-544223 (with English Translation), 15 pages.

POLYMER MATERIAL, FILM, CIRCULAR POLARIZING PLATE, IMAGE DISPLAY APPARATUS, AND MANUFACTURING METHOD FOR FILM

TECHNICAL FIELD

The present invention relates to a polymer material, a film containing the polymer material (in particular, a phase difference film that can be used for an image display apparatus such as a liquid crystal display apparatus and an organic EL), and a manufacturing method for the film. More specifically, the present invention relates to a phase difference film (reverse wavelength dispersion film) having a larger in-plane retardation on a longer wavelength side.

TECHNICAL BACKGROUND

In recent years, among electronic material-related markets, in a flexible display market and a touch panel market, there are increasing needs for a substrate having both heat resistance and transparency. In particular, unlike a conventional glass substrate, a transparent heat resistant plastic film has features such as having a high degree of freedom in shape and allowing thickness reduction and weight reduction to be easily achieved, and allows both maintenance of transparency and high heat resistance required in a manufacturing process to be achieved. Therefore, active development is underway focusing on deployment of flexible electronic device applications such as thin solar cells, electronic paper and organic EL displays as glass substitute materials. According to the above point of view, development of a plastic film having both transparency and heat resistance and a polymer material forming the plastic film is expected to expand a scale of a next generation electronic device application material market, and thus has high significance.

Among highly heat resistant transparent films, transparent optical films used for image display devices represented by various display devices are important as structural elements of various electronic devices including next generation models. Therefore, a large number of transparent optical films have been developed based on a variety of materials design concepts according to various optical characteristics required for designs of display devices. In particular, for image display apparatuses such as a liquid crystal display apparatus and an organic EL, in order to improve display performance such as a viewing angle, various phase difference films are used. Among phase difference films, a phase difference film having a larger in-plane retardation on a longer wavelength side(hereinafter referred to as a "reverse wavelength dispersion film") can be used as an anti-reflection layer of a reflection type liquid crystal display apparatus, a touch panel and an organic EL.

When a reverse wavelength dispersion film is used as an anti-reflection layer, a phase difference is preferably about ¼ of a measurement wavelength (λ) and a ratio (Re (450)/Re (550)) of an in-plane retardation at 450 nm to an in-plane retardation at 550 nm is preferably close to 0.81. Further, in view of thickness reduction of a display apparatus, a reverse wavelength dispersion film to be used is required to have a thin film thickness of 50 μm or less. In response to the characteristics requirement as described above, various phase difference films have been developed.

Patent Document 1 discloses cellulose acylate derivatives having various aromatic and aliphatic acylates, which have different maximum absorption wavelengths and molar extinction coefficients, as substituent groups.

Patent Document 2 discloses that, by introducing a specific aromatic acyl group into a residual hydroxyl group of a specific cellulose alkyl ether and blending (mixing) two or more kinds of resins having different substitution degrees of the aromatic acyl group, and adjusting the substitution degree of the aromatic acyl group to an optimum point, a desired reverse wavelength dispersion (R450/R550=0.81) can be achieved with a thin film having a thickness of about 20-50 μm.

RELATED ART

Patent Documents

Patent Document 1: Japanese Patent Laid-Open Publication No. 2008-95026 (published on Apr. 24, 2008).
Patent Document 2: International Publication No. 2015/060241 (published on Apr. 30, 2015).

SUMMARY OF THE INVENTION

Problems to be Solved by the Invention

However, in conventional technologies represented by the above Patent Documents, heat resistance of a film raw material, and transparency of a film and various optical properties were in a so-called trade-off relationship.

The present invention is accomplished in view of such circumstances and is intended to provide a new polymer material and film formed using the polymer material as a raw material.

Means for Solving the Problems

<1> A polymer material containing at least one kind of a cellulose derivative represented by the following general formula (1):

[Chemical Formula 1]

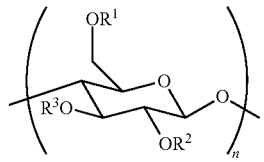

General Formula (1)

[in the general formula (1), $R^1$, $R^2$ and $R^3$ are each independently selected from a group consisting of a hydrogen atom, an organosilyl group (the organosilyl group having a first aliphatic group, an unsaturated aliphatic group or an aromatic group), an acyl group and a second aliphatic group, and, in the cellulose derivative, (a) the organosilyl group (the organosilyl group having a first aliphatic group, an unsaturated aliphatic group or an aromatic group), and (b) the acyl group or the second aliphatic group are contained; and n is a positive integer].

<2> A film containing the polymer material described in the above aspect <1>.

<3> A circular polarizing plate including at least one sheet of the film described in the above aspect <3>.

<4> An image display apparatus including the circular polarizing plate described in the above aspect <4>.

<5> A manufacturing method for the film described in the above aspect <2> including a process of stretching a film containing the polymer material at a temperature in a range of (Tg−10)–(Tg+30)° C. with respect to a glass transition temperature (Tg) of the film containing the polymer material.

Effect of Invention

According to the present invention, a new polymer material, and a film formed using the polymer material as a raw material, are provided.

MODE FOR CARRYING OUT THE INVENTION

An embodiment of the present invention is described as follows. However, the present invention is not limited to this. The present invention is not limited to various structures described below. Various modifications are possible within the scope of the claims. Embodiments and examples obtained by appropriately combining technical means respectively disclosed in different embodiments and examples are also included in the technical scope of the present invention. Further, all of Patent Documents described in the present specification are incorporated by reference in the present specification.

In the present specification, when a numerical range is described as "A-B," the description is intended to mean "A or more and B or less."

A polymer material according to an embodiment of the present invention contains at least one kind of a cellulose derivative represented by the following general formula (1):

[Chemical Formula 2]

General Formula (1)

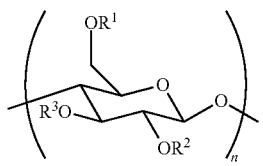

[in the general formula (1), $R^1$, $R^2$ and $R^3$ are each independently selected from a group consisting of a hydrogen atom, an organosilyl group (the organosilyl group having a first aliphatic group, an unsaturated aliphatic group or an aromatic group), an acyl group and a second aliphatic group, and, in the cellulose derivative, (a) the organosilyl group (the organosilyl group having a first aliphatic group, an unsaturated aliphatic group or an aromatic group), and (b) the acyl group or the second aliphatic group are contained; and n is a positive integer].

In an embodiment, in the cellulose derivative, (a) the organosilyl group (the organosilyl group having a first aliphatic group, an unsaturated aliphatic group or an aromatic group), and (b') the acyl group are contained.

In an embodiment, for the polymer material, a substitution degree ($D_1$) of the organosilyl group or the second aliphatic group in the cellulose derivative is 1.00-2.40, a substitution degree ($D_2$) of the acyl group in the cellulose derivative is 0.10-2.00, a total substitution degree ($D_3$) of the acyl group in the polymer material is 0.10-2.00, and the substitution degree ($D_1$) and the substitution degree ($D_2$) satisfy $D_1+D_2 \leq 3.0$.

In an embodiment, the organosilyl group is a trisubstituted organosilyl group.

Further, a film according to an embodiment of the present invention has an in-plane retardation Re (550) of 130-160 nm and a film thickness of 50 μm or less.

In an embodiment, the film has a reverse wavelength dispersion (Re (450)/Re (550)) of 0.50-0.99.

In an embodiment, the film has a photoelastic coefficient (K) of $5 \times 10^{-12}$-$30 \times 10^{-12}$ $m^2/N$.

In this case, the polymer material and the film may be formed from one kind of cellulose derivative or from multiple kinds of cellulose derivatives.

For example, the film according to an embodiment of the present invention may be a film that contains a polymer material formed of a mixture of multiple kinds of cellulose derivatives containing polymerization units represented by the general formula (1) and has an in-plane retardation Re (550) of 130-160 nm, a film thickness of 50 μm or less, a reverse wavelength dispersion (Re (450)/Re (550)) of 0.50-0.99, and a photoelastic coefficient (K) of $5 \times 10^{-12}$-$30 \times 10^{-12}$ $m^2/N$, and in which a substitution degree ($D_1$) of the organosilyl group or the second aliphatic group in the cellulose derivatives is 1.00-2.40, a substitution degree ($D_2$) of the acyl group in the cellulose derivatives is 0.10-2.00, a total substitution degree ($D_3$) of the acyl group in the polymer material is 0.10-2.00, and the substitution degree ($D_1$) and the substitution degree ($D_2$) satisfy $D_1+D_2 \leq 3.0$.

According to an embodiment of the present invention, a polymer material is provided that is excellent in heat resistance and is a raw material for a film excellent in transparency and various optical characteristics. That is, according to an embodiment of the present invention, a polymer material excellent in heat resistance is provided. A phase difference film containing the polymer material has excellent heat resistance, excellent transparency, an excellent reverse wavelength dispersion, an in-plane retardation of about λ/4, a thin film thickness of 50 μm or less, and an excellent photoelastic coefficient.

In contrast, with regard to the phase difference film disclosed in Patent Document 1, although it is possible to develop a desired reverse wavelength dispersion (R450/R550=0.81), phase difference development is very low and it is necessary to increase a film thickness to about 80 μm in order to develop a desired in-plane retardation. Therefore, further improvement is required.

Further, although the film produced using the technology disclosed in Patent Document 2 is a material excellent in both reverse wavelength dispersion and in-plane retardation development and is capable of achieving unprecedented reduction in film thickness, there is a problem that a photoelastic coefficient is high, and color unevenness easily occurs when an external stress is applied to the film in a manufacturing process of a product or the like, and there is a concern that an optical design exhibiting optimum characteristics may become difficult. Therefore, it is preferable to establish a further improved method capable of achieving a low photoelastic coefficient.

In the following, the components are described.

(A) Cellulose Derivative

In the present specification, as described in the above general formula (1), a cellulose derivative is obtained by converting each of three hydroxyl groups of a β-glucose skeleton, which is a monomer forming cellulose, into an alcohol derivative (OR'') by various commonly known conversion reactions.

In the present specification, a polymerization unit of the cellulose derivative depicted in parentheses in the above general formula (1) is also referred to as a "cellulose unit."

By effectively selecting the cellulose derivative, it is possible to achieve both high heat resistance of a polymer material and transparency of a film-forming film, which were difficult to achieve with a conventional cellulose derivative. Further, it is possible to impart high transparency and optical characteristics (high in-plane retardation development, an appropriate reverse wavelength dispersion and a low photoelastic coefficient) to a stretched film produced by stretching the film-forming film.

The cellulose derivative can be various aliphatic and aromatic esters, alkoxyls, amides, urethanes, carbonates, carbamates, and the like depending on forms of substituent groups. The above-described various substituent groups may co-exist in the same molecule. From a point of view of achieving high heat resistance of the stretched film, compatibility of good in-plane retardation and reverse wavelength dispersion, and a low photoelastic coefficient, $R^1$-$R^3$ illustrated in the general formula (1) are preferably each an organosilyl group (the organosilyl group having a first aliphatic group, an unsaturated aliphatic group or an aromatic group), an acyl group or a second aliphatic group. Further, it is more preferable that the cellulose derivative contain an organosilyl group (the organosilyl group having a first aliphatic group, an unsaturated aliphatic group or an aromatic group) and an acyl group or second aliphatic group in the same cellulose molecule.

From a point of view of imparting a reverse wavelength dispersion (Re (450)/Re (550)) to the stretched film, $R^1$-$R^3$ illustrated in the general formula (1) are preferably each an organosilyl group (the organosilyl group having a first aliphatic group, an unsaturated aliphatic group or an aromatic group) or an acyl group. Further, it is more preferable that the cellulose derivative contain an organosilyl group (the organosilyl group having a first aliphatic group, an unsaturated aliphatic group or an aromatic group) and an acyl group in the same cellulose molecule.

In order to clearly distinguish an aliphatic group of the organosilyl group from an aliphatic group bonded to an oxygen atom of a cellulose unit, the former may be referred to as a "first aliphatic group" and the latter may be referred to as a "second aliphatic group."

That the cellulose derivative has an organosilyl group (the organosilyl group having a first aliphatic group, an unsaturated aliphatic group or an aromatic group) greatly improves heat resistance in a state in which transparency is maintained when a film is formed and significantly improves phase difference development of the stretched film, and thus, is preferable.

In the present specification, a glass transition temperature (hereinafter may be referred to as Tg) is used as an indicator of heat resistance of a polymer material and a film formed of the polymer material. When a film containing an existing cellulose derivative as a main component, the glass transition temperature is usually in a range of 130° C.-180° C. In the present specification, when a film has a glass transition temperature higher than 180° C., the film is evaluated as being "highly heat resistant." In the present specification, it is assumed that a glass transition temperature of a polymer material is the same as a glass transition temperature of a film formed using the polymer material as a raw material. Therefore, a polymer material that is a raw material for a "highly heat resistant" film can also be evaluated as being "highly heat resistant."

The organosilyl group (the organosilyl group having a first aliphatic group, an unsaturated aliphatic group or an aromatic group) is not particularly limited. However, from a point of view of imparting solubility of the cellulose derivative with respect to an organic solvent, the organosilyl group preferably has an aliphatic group or an aromatic group, and more preferably further has at least one bulky substituent group. Therefore, among organosilyl groups, a trisubstituted organosilyl group having at least one secondary or tertiary substituent group is preferred.

The bulky substituent group of the organosilyl group corresponds to a tertiary butyl group, a tertiary hexyl group, an isopropyl group, an isobutyl group, a phenyl group, a naphthyl group or the like, and is not particularly limited. However, a tertiary butyl group, a tertiary hexyl group or an isopropyl group is particularly preferred.

By having the preferred substituent group as described above, water resistance of an alkoxyl group (also referred to as an alkoxysilyl group), which has an organosilyl group and is usually hydrolyzable and has low durability against moisture and moisture absorption, is improved. In addition, as an unexpected effect, heat resistance of the cellulose derivative as a mother skeleton of a resin is greatly improved, for example, with a glass transition temperature (Tg) reaching 180° C. or higher while an amorphous nature of the resin is maintained. Transparent heat resistant films of film manufacturing companies that have been developed in the market are mainly super engineering plastics represented by transparent polyimide or transparent polyamide. For example, for a conventional amorphous cellulose derivative such as triacetyl cellulose, there was no material excellent in heat resistance as described above. For a cellulose derivative, a material having high heat resistance is, for example, limited to a crystalline cellulose derivative such as a cellulose wholly aromatic ester represented by a cellulose trisubstituted benzoic acid ester. The cellulose derivative is crystalline and thus it is difficult to produce a transparent film, and currently, application development as a cellulose derivative is also totally different such as that a developed application itself is mainly used as a polysaccharide derivative (column chromatography material) having an optical splitting function.

Further, in a case of having a bulky organosilyl substituent group in a cellulose unit, as will be described later, a high steric hindrance occurs with aromatic acyl groups introduced into the same cellulose unit and adjacent cellulose units, and free rotation of aromatic rings of the aromatic acyl groups is inhibited. As a result, in a stretched film, it is possible to also develop an effect of suppressing an increase in the photoelastic coefficient at the same time. As described above, for example, the trisubstituted organosilyl group preferably has at least one bulky substituent group represented by a tertiary butyl group, a tertiary hexyl group, an isopropyl group or the like. From a point of view of easily managing introduction into a cellulose skeleton, the organosilyl group is preferably any one of a tertiary butyldimethylsilyl group (hereinafter, may be also referred to as a TBDMS group), a tertiary butyldiphenylsilyl group (hereinafter, may be also referred to as a TBDPS group), a tertiary hexyldimethylsilyl group (hereinafter, may also be referred to as a THDMS group), and a triisopropylsilyl group (hereinafter, may also be referred to as a TIPS group).

From a point of view of bulkiness of the entire organosilyl group, the TBDMS group and the THDMS group are preferable. Since a substituent group other than a tertiary butyl group is a methyl group, the TBDMS group has an appropriate bulkiness from the above point of view. Further, since a substituent group other than a tertiary hexyl group is a methyl group, the THDMS group has an appropriate bulkiness from the above point of view. On the other hand, for example, when the organosilyl group further has a similar bulky substituent group in addition to the tertiary butyl group or the tertiary hexyl group, the organosilyl group as a whole becomes an excessively bulky substituent group. Therefore, it is difficult to control an organosilyl group substitution degree with respect to a cellulose skeleton within an appropriate range. Further, from a point of view of industrial availability of raw materials, the organosilyl group is more preferably a TBDMS group. By adopting a TBDMS group as an organosilyl group, it is possible to easily achieve a target substitution degree in a cellulose derivative.

An acyl group is not particularly limited as long as the acyl group has an acyl structure (RCO—). Acyl groups are classified into multiple kinds according to a structure of an R portion in the above formula, and among the acyl groups, an aliphatic acyl group and an aromatic acyl group are included.

An example of the aliphatic acyl group is a structure in which R is formed of an alkyl group. In this case, examples of the aliphatic acyl group include various linear, branched, and cyclic structures and the like depending on a length of the alkyl group, and there is no particular limitation. Further, it is also possible to have an unsaturated alkyl group. Specific examples include an acetyl group, a propionyl group, a butyryl group, a cyclo hexyl group and the like.

Examples of the aromatic acyl group include structures formed by an aromatic ring or polycyclic aromatic ring in which R is substituted or unsubstituted, a heterocyclic ring or a polycyclic heterocyclic ring in which R is substituted or unsubstituted, and the like. Here, the term "polycyclic" refers to a compound in which at least two or more aromatic rings or heterocyclic rings share at least two or more sp2 carbon atoms of the aromatic rings or heterocyclic rings. Further, the substituent group is not particularly limited, and specific examples of the substituent group include, for example, an aliphatic substituent group, an unsaturated aliphatic substituent group, an aromatic substituent group, an alkoxyl group, a carbonyl group, an ester group, halogen, imide, carbamate, and the like.

Among the above-described substituent groups, based on a point of view that a suitable reverse wavelength dispersion can be developed, it is preferable to introduce an aromatic acyl group into a cellulose derivative, and more preferably it is a 1-naphthoyl group or a 2-naphthoyl group. From a point of view that a superior reverse wavelength dispersion is developed even at a low substitution degree, more preferably, it is a 2-naphthoyl group. The 2-naphthoyl group may have a substituent group in a naphthalene ring. The substituent group is not particularly limited, and an alkoxyl group, an ester group, an amide group, a nitrile group, a halogen, or the like is applicable.

An aromatic acyl group exhibits an excellent effect on development of a reverse wavelength dispersion due to its high polarizability, but it also exhibits an unfavorable effect of concomitantly increasing a photoelastic coefficient due to free rotation of an aromatic ring. The photoelastic coefficient increases in proportion to the number of aromatic rings of the aromatic acyl group and to a substitution degree of the aromatic acyl group in the cellulose derivative. That is, introducing an aromatic acyl group into a cellulose derivative in order to develop a reverse wavelength dispersion results in a trade-off relationship that the photoelastic coefficient increases.

As a general knowledge, it is understood that an occurrence mechanism of color unevenness caused by a high photoelastic coefficient value of a resin having an aromatic ring is derived from easiness (degree of freedom) of rotation of the aromatic ring when a stress is applied to a polymer chain having the aromatic ring. Therefore, in order to reduce the photoelastic coefficient while maintaining a good reverse wavelength dispersion, it is preferable to inhibit the free rotation of the aromatic ring of the aromatic acyl group introduced into a molecular skeleton. In an embodiment of the present invention, as described above, by introducing an aromatic acyl group and a bulky organosilyl group into the same molecular skeleton, rotation of an aromatic ring is inhibited by a high steric hindrance, and both a low photoelastic coefficient and a good reverse wavelength dispersion are achieved.

In the cellulose derivative represented by the above general formula (1), $R^1$-$R^3$ may each be an aliphatic group. An aliphatic group is any substituent group formed by an alkyl group. In this case, examples of the aliphatic acyl group include various linear, branched, and cyclic structures and the like depending on a length of the alkyl group, and there is no particular limitation. Further, it is also possible to have an unsaturated alkyl group. Examples of the aliphatic group include a methyl group, an ethyl group, a propyl group, an isopropyl group, a butyl group, an isobutyl group, a tertiary butyl group, a cyclo hexyl group, and the like.

In order to clearly distinguish an aliphatic group that is directly bonded to an oxygen atom of a hydroxyl group of a cellulose unit described above from an aliphatic group of an organosilyl group that is similarly directly bonded to an oxygen atom of a hydroxyl group of a cellulose unit, the former may be referred to as a "second aliphatic group," and the latter may be referred to as a "first aliphatic group."

By thermally stretching a film obtained from the cellulose derivative, in addition to achieving both a good in-plane retardation and a good reverse wavelength dispersion, which are usually in a trade-off relationship in other cellulose derivatives, it is possible to manufacture a film that achieves a low photoelastic coefficient which was difficult in the prior art. Therefore, it is possible to greatly reduce a thickness of a film in a state in which good reverse wavelength dispersion and in-plane retardation are maintained, and further, by having a lower photoelastic coefficient, it is possible to prevent color unevenness when an external stress is applied to the film. Further, the cellulose derivative is not limited to a single derivative, but may be a mixture of two or more derivatives as long as compatibilization is possible.

In the present specification, the cellulose derivative that is represented by the general formula (1) and is contained in a film is also referred to as a "polymer material." The "polymer material" may be formed of one kind of a cellulose derivative or may be formed of a mixture of multiple kinds of cellulose derivatives. Further, a film according to an embodiment of the present invention may contain a component other than the "polymer material" described above as long as heat resistance is not impaired.

(B) Conversion Reaction of Cellulose Derivative

As a conversion reaction for producing the above-described cellulose derivative, a commonly known synthesis method can be appropriately used. An example of a particularly simple method is described below, but the present invention is not limited to this. First, by subjecting commercially available powdered cellulose to a heating and cooling treatment in the presence of a polar organic solvent exemplified by N,N-dimethylacetamide and lithium halide exemplified by lithium chloride, a solution is prepared in which the cellulose forms a complex and is homogeneously dissolved. Subsequently, a nucleophilic catalyst exemplified by N,N-dimethylaminopyridine and an organic amine exemplified by triethylamine are added, and organosilyl chloride exemplified by tertiary butyldimethylchlorosilane is added dropwise, and the mixture is allowed to react. Thereafter, by washing a reaction product with water and an organic solvent, a cellulose silyl ether having a predetermined organosilyl group substitution degree is synthesized. Subsequently, the cellulose silyl ether and acyl chloride (for example, 2-naphthoyl chloride) are heated in a state of co-existing in the presence of pyridine. Thereafter, by washing a reaction product with water and an organic solvent, a desired cellulose derivative in which a residual hydroxyl group in the cellulose silyl ether is aromatic-esterified can be obtained.

In the following, the above-described synthesis method of the cellulose derivative is more specifically described. However, the synthesis method of the cellulose derivative is not limited to the following example. Further, a more specific synthesis method is disclosed in Synthesis Examples described below.

The present method includes (1) a process of introducing an organosilyl group or a second aliphatic group into a cellulose skeleton (etherification) to obtain a cellulose ether, and (2) a process of introducing an acyl group into the cellulose ether (esterification) to obtain a cellulose ether ester. That is, in this example, since a TBDMS group is used as an organosilyl group and a 2-naphthoyl group is used as an acyl group, in the above processes, a cellulose skeleton is silyl-etherified to obtain a cellulose silyl ether, and subsequently, the cellulose silyl ether is naphthoylated to obtain a cellulose silyl ether aromatic ester.

First, powdered cellulose and dimethylacetamide are added to a flask, and the mixture is heated and stirred at 130° C. for 2 hours, and thereafter, lithium chloride is added and the temperature is returned to a room temperature to dissolve the cellulose. Next, tertiary butyldimethylchlorosilane dissolved in dimethylacetamide is added to the flask with a dropping funnel, and thereafter, the mixture is stirred at a room temperature for 5 hours. After the stirring, the solution is poured into methanol to precipitate a resin. The resin is collected by filtration and is purified by repeating 5-7 times a process of stirring and washing in methanol for 60 minutes. The above is a process of silyl-etherifying the cellulose skeleton. Regarding the present process, for example, the disclosure content of International Publication No. WO 2008/143322 can be referenced (this document is incorporated herein in its entirety).

The TBDMS-etherified cellulose (the resin obtained by the above-described process) and pyridine are added to the flask and are dissolved by heating the mixture to 80° C. while stirring the mixture. Next, 2-naphthoyl chloride dissolved in pyridine is added dropwise and the mixture is stirred at 80° C. for 5 hours. After the stirring, the solution is poured into methanol to precipitate a resin. The resin is collected by filtration and is purified by repeating 3 times a process of stirring and washing in methanol for 60 minutes. The above is a process of naphthoylating the cellulose silyl ether. Regarding the present process, for example, the disclosure content of Japanese Patent Laid-Open Publication No. 2009-132764 can be referenced (this document is incorporated herein in its entirety).

As a result, a cellulose derivative into which the TBDMS group and the 2-naphthoyl group are introduced can be synthesized.

(C) Cellulose Substitution Degree

D (specifically, $D_1$-$D_3$) represents how much three hydroxyl groups existing at 2nd, 3rd and 6th positions in a cellulose molecule are substituted on average, and a maximum value is 3. In this case, substantially the same number of each of the three hydroxyl groups existing at the 2nd, 3rd and 6th positions in the cellulose molecule may be substituted. On the other hand, it is also possible that, among the three hydroxyl groups existing at the 2nd, 3rd and 6th positions in the cellulose molecule, a hydroxyl group existing at any one of the positions is substituted more and other hydroxyl groups are substituted less.

A substitution degree ($D_1$) indicates how much the three hydroxyl groups existing at the 2nd, 3rd and 6th positions in the cellulose molecule are substituted by an organosilyl group or a second aliphatic group on average in the various kinds of cellulose derivatives contained in a film, and a maximum value is 3. In this case, substantially the same number of each of the three hydroxyl groups existing at the 2nd, 3rd and 6th positions in the cellulose molecule may be substituted. On the other hand, it is also possible that, among the three hydroxyl groups existing at the 2nd, 3rd and 6th positions in the cellulose molecule, a hydroxyl group existing at any one of the positions is substituted more and other hydroxyl groups are substituted less.

The substitution degree ($D_1$) due to an organosilyl group may be particularly referred to as an "organosilyl group substitution degree." Similarly, the substitution degree ($D_1$) due to a second aliphatic group may be particularly referred to as a "second aliphatic group substitution degree." In general, the substitution degree ($D_1$) may be rephrased as an "RO group substitution degree" or an "R group substitution degree" (an RO group and a R group are respectively functional groups having structures of RO and R) (for example, when R is an ethyl group, the substitution degree ($D_1$) may be referred to as an "ethyl group substitution degree" or an "ethoxy group substitution degree").

When the cellulose derivative is not substituted by a second aliphatic group, the substitution degree ($D_1$) means a substitution degree due to an organosilyl group. On the other hand, when the cellulose derivative is substituted by a second aliphatic group, the substitution degree ($D_1$) is a sum of a substitution degree due to an organosilyl group and a substitution degree due to a second aliphatic group.

A substitution degree ($D_2$) indicates how much the three hydroxyl groups existing at the 2nd, 3rd and 6th positions in the cellulose molecule are acylated on average in the various kinds of cellulose derivatives contained in a film, and a maximum value is 3. In this case, substantially the same number of each of the three hydroxyl groups existing at the 2nd, 3rd and 6th positions in the cellulose molecule may be substituted. On the other hand, it is also possible that, among the three hydroxyl groups existing at the 2nd, 3rd and 6th positions in the cellulose molecule, a hydroxyl group existing at any one of the positions is substituted more and other hydroxyl groups are substituted less.

A total substitution degree ($D_3$) indicates how much the three hydroxyl groups existing at the 2nd, 3rd and 6th positions in the cellulose molecule are acylated on average in a polymer material contained in a film, and a maximum value is 3. For example, when the polymer material is formed of one kind of a cellulose derivative, the total substitution degree ($D_3$) indicates how much the three hydroxyl groups existing at the 2nd, 3rd and 6th positions in the cellulose molecule are acylated on average in the one kind of the cellulose derivative, and a maximum value is 3. On the other hand, when the polymer material is formed of a mixture of multiple kinds of cellulose derivatives, the total substitution degree ($D_3$) indicates how much the three hydroxyl groups existing at the 2nd, 3rd and 6th positions in the cellulose molecule are acylated on average in the entire mixture of the multiple kinds of the cellulose derivatives, and a maximum value is 3.

An acyl group (RCO—) can adopt various forms depending on the structure of R. When focusing on RCO having a specific structure, the substitution degree ($D_2$) and the total substitution degree ($D_3$) may be rephrased as an "RCO group substitution degree" and a "RCO group total substitution degree" (the RCO group is a functional group having a structure of RCO) (for example, when a cellulose molecule is substituted by a 2-naphthoyl group, the substitution degree ($D_2$) may be referred to as a "2-naphthoyl group substitution degree"; similarly, the substitution degree ($D_3$) may be referred to as a "2-naphthoyl group total substitution degree").

The value of D can be calculated by a commonly known method. For example, when the organosilyl group is a TBDMS group, the organosilyl group substitution degree ($D_1$) can be quantified using a method described in "Cellulose Communications 6, 73-79 (1999)" (nuclear magnetic resonance spectroscopy: NMR). This document is incorporated herein by reference.

As described above, the substitution degree ($D_1$) and the substitution degree ($D_2$) each mean a substitution degree of a kind of a cellulose derivative forming the polymer material, and, on the other hand, the total substitution degree ($D_3$) means an acyl group substitution degree of the entire polymer material. Specifically, when the polymer material is formed of one kind of a cellulose derivative, the value of the total substitution degree ($D_3$) of the polymer material is the same as the value of the substitution degree ($D_2$) of the one kind of the cellulose derivative. On the other hand, when the polymer material is formed of a mixture of multiple kinds of cellulose derivatives, the value of the total substitution degree ($D_3$) of the polymer material is determined based on the values of the substitution degrees ($D_2$) of the multiple kinds of the cellulose derivatives.

In the following, the total substitution degree ($D_3$), the substitution degree ($D_1$) and the substitution degree ($D_2$) are further described in detail.

First, the total substitution degree ($D_3$) is described.

An amount of the acyl group to be introduced into the polymer material (in other words, the total substitution degree ($D_3$)) is preferably an amount capable of developing a reverse wavelength dispersion. When the total substitution degree ($D_3$) is in a range of 0.10-2.00, in addition to a good reverse wavelength dispersion, possibility that birefringence becomes negative is reduced, and thus, both can satisfy practical level characteristics. Therefore, that the total substitution degree ($D_3$) is in the range of 0.10-2.00 is more preferable.

A suitable amount of the acyl group to be introduced into the polymer material varies depending on the kinds of the acyl group and other substituent groups to be introduced. In a case of a combination of a TBDMS group and a 2-naphthoyl group, which are preferred structural elements in an embodiment of the present invention, the total substitution degree ($D_3$) can be 0.10-1.00. Based on a point of view of developing a good reverse wavelength dispersion, the total substitution degree ($D_3$) is preferably 0.15-0.50, and more preferably 0.18-0.25.

Next, the substitution degree ($D_1$) is described.

Depending on the kind and the substitution degree ($D_1$) of the organosilyl group and/or the second aliphatic group of the cellulose derivative, solubility with respect to a solvent, phase difference development, the value of the photoelastic coefficient, and water resistance greatly change. An appropriate amount of unsubstituted hydroxyl group is necessary for an acyl group introduction reaction for a purpose of developing a reverse wavelength dispersion. Therefore, the substitution degree ($D_1$) of the organosilyl group or the second aliphatic group is preferably 1.00-2.40.

When the substitution degree ($D_1$) of the organosilyl group or the second aliphatic group is 1.00 or more, a kind of a solvent in which a desired cellulose derivative is soluble is not limited and a sufficient film strength can be obtained. On the other hand, when the substitution degree ($D_1$) of the organosilyl group or the second aliphatic group is 2.40 or less, the kind of the solvent in which the desired cellulose derivative is soluble is not limited, and difficulty in introducing the acyl group due to that surroundings of a remaining hydroxyl group becomes extremely bulky is prevented and difficulty in applying thermal stretching to a film due to that a glass transition temperature (Tg) becomes too high is prevented. Therefore, that the substitution degree ($D_1$) of the organosilyl group or the second aliphatic group is 2.40 or less is preferable. Therefore, the substitution degree ($D_1$) of the organosilyl group or the second aliphatic group is 1.00-2.40 as described above, and is preferably 1.30-2.00, more preferably 1.40-1.80, and even more preferably 1.50-1.60.

In an embodiment of the present invention, by introducing an acyl group into an OH group remaining in a cellulose ether skeleton having the substitution degree ($D_1$) of the organosilyl group or the second aliphatic group in the above range, a main chain component (cellulose silyl ether skeleton) in the cellulose derivative is orthogonal to an acyl group of a side chain component.

As a result, for the cellulose derivative, additivity is established with respect to birefringence of two components. Due to a difference in wavelength dispersibility of in-plane retardation, which is developed by birefringence of the components, when a stretched film is formed, a reverse wavelength dispersion is developed. Therefore, additivity also holds for the in-plane retardation and the reverse wavelength dispersion. That is, with respect to the in-plane retardation of the cellulose derivative, additivity of an in-plane retardation of a main chain component of the cellulose derivative and an in-plane retardation of a side chain component of the cellulose derivative is established. Further, with respect to the reverse wavelength dispersion of the cellulose derivative, additivity of a reverse wavelength dispersion of a main chain component of the cellulose derivative and a reverse wavelength dispersion of a side chain component of the cellulose derivative is established. Further, with respect to the in-plane retardation and the reverse wavelength dispersion of the polymer material, the additives from the cellulose derivative forming the polymer material are also respectively established.

When a stretched film is manufactured, it is necessary to generate a positive birefringence in the stretched film and to develop a positive in-plane retardation in the stretched film by thermally stretching a film-forming film at a preferred magnification ratio. In this case, since an introduction amount of a side chain component in the cellulose derivative is not excessive, it is prevented that a maximum birefringence direction of the stretched film changes and that the stretched film has negative birefringence, a negative in-plane retardation and a normal wavelength dispersion (it is prevented from having a stretched film that contains a cellulose derivative having negative birefringence). Therefore, desired characteristics can be developed.

Next, the substitution degree ($D_2$) is described.

In an embodiment of the present invention, an acyl group is introduced into an OH group remaining in a cellulose silyl ether skeleton having the substitution degree ($D_1$) of the organosilyl group or the second aliphatic group in the above-described range. In this case, the acyl group may be introduced into substantially all of the remaining OH groups, or the acyl group may be introduced into some of the remaining OH groups.

From a point of view that a desired value of the total substitution degree ($D_3$) is easily realized, the substitution degree ($D_2$) is 0.10-2.00, and preferably 0.15-1.00.

When the polymer material is formed of one kind of a cellulose derivative (in other words, when the value of the total substitution degree ($D_3$) of the polymer material is the same as the value of the substitution degree ($D_2$) of the one kind of the cellulose derivative forming the relevant polymer material), the substitution degree ($D_2$) can be 0.10-2.00. Based on a point of view of developing a good reverse wavelength dispersion, the substitution degree ($D_2$) is preferably 0.15-0.50, and more preferably 0.18-0.25.

As described above, polymer materials can be roughly classified into a case where a polymer material is formed of one kind of a cellulose derivative and a case where a polymer material is formed of a mixture of multiple kinds of cellulose derivatives.

When the polymer material is formed of one kind of a cellulose derivative, the value of the total substitution degree ($D_3$) of the acyl group of the polymer material is the same as the value of the substitution degree ($D_2$) of the acyl group of the one kind of the cellulose derivative. On the other hand, when the polymer material is formed of a mixture of multiple kinds of cellulose derivatives, the value of the total substitution degree ($D_3$) of the acyl group of the polymer material can be calculated based on the values of the substitution degrees ($D_2$) of the acyl group of the multiple kinds of the cellulose derivatives. As the calculation method, the simulation method described in International Publication No. WO 2015/060241 can be suitably used (this document is incorporated herein by reference).

(D) In-Plane Retardation: Re ($\lambda$)

The in-plane retardation (also referred to as an in-plane phase difference) Re ($\lambda$) represents an in-plane retardation measured with light of a wavelength of $\lambda$ nm, and is defined by the following formula (1).

$$\mathrm{Re}(\lambda) = \Delta Nxy(\lambda) \times d \quad (1)$$

Here, $\Delta Nxy$ ($\lambda$) represents a birefringence measured with light of a wavelength of $\lambda$ nm, and d represents a thickness (μm) of a film. Here, the birefringence is a difference between a maximum refractive index and a minimum refractive index among in-plane refractive indexes of the film.

When a film according to an embodiment of the present invention is used as a phase difference film, in particular, as an anti-reflection layer of a film, an in-plane retardation of the film is preferably about ¼ of a measurement wavelength of the in-plane retardation. In particular, in a case of an in-plane retardation Re (550) at a measurement wavelength of 550 nm, since ¼ of the measurement wavelength is 137.5 nm, the in-plane retardation Re (550) is preferably 130-160 nm, and more preferably 130-150 nm.

(E) Reverse Wavelength Dispersion: Re (450)/Re (550)

When a film according to an embodiment of the present invention is used as a phase difference film, in particular, as an anti-reflection layer, a reverse wavelength dispersion (Re (450)/Re (550)) of the film is preferably 0.50-0.99, more preferably 0.60-0.90, more preferably 0.70-0.90, more preferably 0.75-0.90, even more preferably 0.80-0.89, and particularly preferably 0.81-0.83. When the in-plane retardation and the reverse wavelength dispersion are in the above-described ranges, a sufficient anti-reflection function over the entire wavelength range is achieved. Therefore, that the in-plane retardation and the reverse wavelength dispersion are in the above-described ranges is preferable.

(F) Photoelastic Coefficient: K ($\times 10^{-12}$ m$^2$/N)

A photoelastic coefficient is a value obtained by dividing a change amount of birefringence when a stress is applied to a film or the like by the stress. When a film having a high photoelastic coefficient is used for a liquid crystal display apparatus or the like and the film is pasted on a substrate, the film receives a stress due to a difference with respect to a thermal expansion coefficient of the substrate, and a phase difference greatly changes. Due to the change in the phase difference, adverse effects occur on functions of the liquid crystal display apparatus or the like (for example, color unevenness occurs in the display apparatus incorporating the film, and the like). Therefore, a film having a large photoelastic coefficient is not preferable as a film used for a liquid crystal display apparatus or the like.

From the above-described matters, the photoelastic coefficient of the film according to an embodiment of the present invention is preferably low. When the film is used for an anti-reflection layer of an actual product (such as an image display apparatus such as a liquid crystal display apparatus or an organic EL), the photoelastic coefficient (K) of the film is preferably $5 \times 10^{-12}$-$30 \times 10^{-12}$ m$^2$/N, more preferably $5 \times 10^{-12}$-$20 \times 10^{-12}$ m$^2$/N, and even more preferably $5 \times 10^{-12}$-$15 \times 10^{-12}$ m$^2$/N.

(G) Haze

A value of haze of a film according to an embodiment of the present invention (for example, a stretched film) is not particularly limited, but is 2.00% or less, more preferably 1.00% or less, and even more preferably 0.50% or less. When the value of haze is within the above range, there is an advantage that transparency of the stretched film can be improved by increasing a total light transmittance of the stretched film. Therefore, that the value of haze is within the above range is preferable.

(H) Film Thickness

When the film according to an embodiment of the present invention is used as a phase difference film, in particular, as an anti-reflection layer, when a thickness of the entire anti-reflection layer is considered, a thickness of the film is 50 μm or less, preferably 40 μm or less, and more preferably 30 μm or less. A lower limit of the thickness of the film is not particularly limited, but is, for example, 20 μm.

The thickness of the film may be further reduced as long as the desired in-plane retardation and reverse wavelength dispersion are satisfied. On the other hand, when the film has a thickness of not more than the above-described thickness, for example, when the film is manufactured using a solvent casting method, a drying time of the solvent does not become excessively long and productivity is not lowered.

(I) Glass Transition Temperature (Tg)

When a molten polymer material such as the film according to an embodiment of the present invention is quenched, the polymer material changes to a glass state. A temperature at which this change occurs is referred to as a glass transition temperature, and can be measured, for example, using a method described in Examples.

The glass transition temperature is an indicator of heat resistance. In the case of the film according to an embodiment of the present invention, the glass transition temperature is preferably 180° C. or higher, and more preferably 200° C. or higher. There is also a glass transition temperature for the polymer material according to an embodiment of the present invention, and its value can be considered as the glass transition temperature of a film formed only of the polymer material.

(J) Third Component

When a film according to an embodiment of the present invention is manufactured from a polymer material, additives such as a plasticizer and a heat stabilizer, an ultraviolet stabilizer, an in-plane retardation increasing agent, and a filler may be added as needed as third components. In particular, it is effective to add a plasticizer for a purpose of compensating for brittleness of the obtained film or for a purpose of improving processing characteristics such as stretching. Blending amounts of these third components are arbitrary as long as desired optical characteristics are not impaired.

(K) Molecular Weight of Cellulose Derivative

A molecular weight of the cellulose derivative (resin) used in the present invention is not particularly limited as long as film forming is possible. For example, in order to obtain a film excellent in toughness, a number average molecular weight of the resin is preferably 10,000-400,000. When a resin formed from a natural resin as a raw material is used, from a point of view of availability, the number average molecular weight of the resin is more preferably 20,000-200,000. When the number average molecular weight is 10,000 or more, the film is imparted with sufficient toughness. On the other hand, when the number average molecular weight is 400,000 or less, the resin is sufficiently dissolved in a solvent and an increase in an amount of the solvent used during solution casting due to lowering of a solid content concentration of the resin solution can be prevented. Therefore, that the number average molecular weight is 400,000 or less is preferable.

(L) Film Forming Method

The film of the present invention is preferably manufactured by stretching an unstretched film-forming film (also referred to as an unstretched film). The unstretched film-forming film can be prepared according to a commonly known method.

Examples of a representative molding method of an unstretched film include a melt extrusion method in which a molten resin is extruded from a T die or the like into a film, and a solvent casting method in which a film is formed by casting an organic solvent in which a resin is dissolved onto a support and drying the organic solvent by heating. For a reason that film having good thickness accuracy can be relatively easily obtained, the solvent casting method is preferably used.

The solvent in the case where the solvent casting method is adopted is not particularly limited. As the solvent, halogenated hydrocarbon solvents such as methylene chloride and chloroform, ketone-based solvents such as acetone, methyl ethyl ketone and methyl isobutyl ketone, aromatic solvents such as toluene and xylene, ester-based solvents such as ethyl acetate and butyl acetate, and the like can be used. Among these solvents, the halogenated hydrocarbon solvents such as methylene chloride and the aromatic solvents such as toluene and xylene tend to allow a resin material to be easily dissolved, also tend to have low boiling points, and also tend to allow a film to have high transparency, and thus are preferable. In particular, methylene chloride has a boiling point as low as 40° C. and is highly safe against fire or the like during drying, and thus is particularly preferable as a solvent used in manufacturing a film according to an embodiment of the present invention.

From a point of view of recovery and recycling, it is preferable to use methylene chloride alone as a solvent in an embodiment of the present invention. However, it is also possible to use a mixed solvent containing 70-99 wt % of methylene chloride and 1-30 wt % of an alcohol having 3 or less carbon atoms.

When a mixed solvent is used, as the alcohol having 3 or less carbon atoms, ethyl alcohol is safe and also has a low boiling point and thus is preferable. Further, in order to suppress cost, it is preferable that an alcohol having 3 or less carbon atoms other than ethyl alcohol is contained in an amount of 1-10 parts by weight in 100 parts by weight of alcohols having 3 or less carbon atoms. As the alcohol having 3 or less carbon atoms other than ethyl alcohol, isopropyl alcohol is particularly preferably used from a point of view of safety and a boiling point. Further, here the solvent referred to means a solvent having a boiling point lower than a maximum temperature applied to a film in a drying process or a stretching process.

(M) Substrate of Solvent Casting Method

When a film is formed using the solvent casting method, a resin is dissolved in a solvent, and thereafter, the solvent is cast onto a support, and the solvent is dried to form a film.

A viscosity of the solvent in which the resin is dissolved is preferably 10-50 poise, and more preferably 15-50 poise. As a preferred support, a stainless steel endless belt and a film (a polyimide film, a biaxially stretched polyethylene terephthalate film, or the like) can be used.

Drying after casting can also be performed while the film is carried on the support. However, when necessary, it is also possible that the film preliminarily dried until a self-supporting property is developed is peeled off from the support and is further dried.

For drying, in general, a float method and a tenter and roll conveying method can be used. In the case of the float method, a film itself receives a complex stress, and non-uniformity of optical characteristics is likely to occur. Further, in the case of the tenter method, it is necessary to balance a width shrinkage accompanying drying of the solvent and a tensional force for supporting a self weight by controlling a distance of pins or clips supporting both ends of the film, and a control means is complicated. On the other hand, in the case of the roll conveying method, since a tensional force for stable film conveying is applied in principle in a flow direction (MID direction) of the film, there is an advantage that it is easy to make a direction of a stress applied to the film constant. Therefore, it is preferable that the film is dried using the roll conveying method.

Further, drying in an atmosphere in which humidity is kept low so that the film does not absorb moisture when the solvent is dried is an effective method for obtaining a film according to an embodiment of the present invention having high mechanical strength and transparency.

(N) Stretch Ratio

The film according to an embodiment of the present invention is preferably a film (also referred to as a stretched film) obtained by at least uniaxially stretching the unstretched film obtained above according to a commonly known stretching method and performing an orientation treatment. As a stretching method, a uniaxial or biaxial thermal stretching method can be adopted. In order to obtain a film of the present invention, it is preferable to adopt longitudinal uniaxial stretching. Further, when a film according to an embodiment of the present invention is used as an anti-reflection layer, since uniaxiality is important, free end uniaxial stretching is preferred.

A stretch ratio (X) is expressed by the following formula (2). Here, L0 is a length of the unstretched film, and L is a length of the stretched film.

$$X=\{(L-L0)/L0\}\times 100 \qquad (2)$$

The stretch ratio when the film of the present invention is manufactured is preferably 20-200%, more preferably 20-150%, even more preferably 20-100%, and particularly preferably 30-100%.

When the stretch ratio is 200% or less, it is possible to prevent an extreme decrease in strength in a direction (TD direction) perpendicular to a stretching direction due to that an in-plane retardation of the stretched film becomes excessively larger than a target numerical range and that the polymer material is excessively oriented. Therefore, that the stretch ratio is 200% or less is preferable.

On the other hand, when the stretch ratio is 20% or more, the birefringence of the stretched film becomes sufficiently large, and the film having a desired in-plane retardation can be prevented from becoming excessively thick.

The stretch ratio when an film according to an embodiment of the present invention is manufactured is preferably 20-200%, more preferably 40-150%, and even more preferably 50-100%. With this structure, when an alkoxyl group, which is a substituent group of a cellulose derivative, is an organosilyl group, a desired in-plane retardation can be suitably realized while preventing breakage of the film. (O) Stretching Temperature A stretching temperature is preferably selected in a range of (Tg−30)-(Tg+30)° C. with respect to the glass transition temperature (Tg) of the film. A particularly preferable stretching temperature is in a range of (Tg−10)-(Tg+30)° C.

More specifically, the stretching temperature is preferably 200-250° C., and more preferably 220-250° C.

When the stretching temperature is within the above-described temperature range, it is possible to reduce dispersion in phase difference of the obtained film and to develop all of an optimum reverse wavelength dispersion, an optimum in-plane retardation and an optimum photoelastic coefficient (specifically, a low photoelastic coefficient).

(P) Circular Polarizing Plate and Image Display Apparatus

A film of the present invention can be used as a phase difference film having a phase difference of about ¼ of a measurement wavelength (λ) (also referred to as a λ/4 plate), in particular, as a phase difference film having an excellent reverse wavelength dispersion. Further, since a required phase difference can be achieved with an unprecedented thin thickness, a film of the present invention can also be used as an anti-reflection layer for film thickness reduction in a mobile device or the like such as a smart phone or in an application requiring flexibility. One form of an anti-reflection layer is a circular polarizing plate containing a film according to an embodiment of the present invention.

A circular polarizing plate is an optical element that converts unpolarized light into circularly polarized light. A film used for the circular polarizing plate is particularly preferably a stretched film. An example of a structure of the circular polarizing plate is a laminate in which a polarizer and a film according to an embodiment of the present invention are pasted to each other such that an absorption axis of the polarizer and a slow axis of the film form an angle of 45 degrees. An adhesive layer and a polarizer protective film used in this case can be of any structures. These anti-reflection layers can be usefully used in image display apparatuses such as a liquid crystal display apparatus and an organic EL. Further, a film according to an embodiment of the present invention can also be used as a polarizer protective film. A surface of a film according to an embodiment of the present invention may be subjected to optical adjustment such as hard coat and index matching, or a surface treatment for prevention of static charge or the like. Further, a film according to an embodiment of the present invention can also be used for a touch panel or an electromagnetic wave shield by providing a transparent conductive layer on the film. [Other Structures of the Present Invention]

The present invention can also be structured as follows.

(1) A polymer material containing at least one kind of a cellulose derivative represented by the following general formula (1):

[Chemical Formula 3]

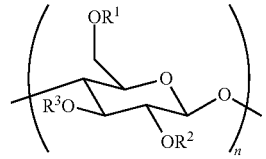

General Formula (1)

[in the general formula (1), $R^1$, $R^2$ and $R^3$ are each independently selected from a group consisting of a hydrogen atom, an organosilyl group (the organosilyl group having a first aliphatic group, an unsaturated aliphatic group or an aromatic group), an acyl group and a second aliphatic group, and, in the cellulose derivative, (a) the organosilyl group (the organosilyl group having a first aliphatic group, an unsaturated aliphatic group or an aromatic group), and (b) the acyl group or the second aliphatic group are contained; and n is a positive integer].

(2) In the polymer material described in the above aspect (1), in the cellulose derivative, (a) the organosilyl group (the organosilyl group having a first aliphatic group, an unsaturated aliphatic group or an aromatic group), and (b') the acyl group are contained.

(3) In the polymer material described in the above aspect (1), a substitution degree ($D_1$) of the organosilyl group or the second aliphatic group in the cellulose derivative is 1.00-2.40, a substitution degree ($D_2$) of the acyl group in the cellulose derivative is 0.10-2.00, a total substitution degree ($D_3$) of the acyl group in the polymer material is 0.10-2.00, and the substitution degree ($D_1$) and the substitution degree ($D_2$) satisfy $D_1+D_2\leq 3.0$.

(4) In the polymer material described in the above aspect (1), at least one of the organosilyl groups is a trisubstituted organosilyl group.

(5) In the polymer material described in the above aspect (1), at least one of the organosilyl groups has at least one selected from a group consisting of a tertiary butyl group, a tertiary hexyl group and an isopropyl group.

(6) The polymer material described in the above aspect (1) has a glass transition temperature (Tg) of 180° C. or higher.

(7) In the polymer material described in the above aspect (1), at least one of the acyl groups is an acyl group having a 1-naphthoyl group or a 2-naphthoyl group.

(8) In the polymer material described in the above aspect (1), at least one of the acyl groups is an acyl group having a 2-naphthoyl group.

(9) A film containing the polymer material described in the above aspects (1)-(8).

(10) The film described in the above aspect (9) having an in-plane retardation Re (550) of 130-160 nm, and a film thickness of 50 μm or less.

(11) The film described in the above aspect (9) having a reverse wavelength dispersion (Re (450)/Re (550)) of 0.50-0.99.

(12) The film described in the above aspect (9) having a photoelastic coefficient (K) of $5 \times 10^{-12}$–$30 \times 10^{-12}$ $m^2/N$.

(13) A circular polarizing plate including at least one sheet of the film described in the above aspect (9).

(14) An image display apparatus including the circular polarizing plate described in the above aspect (13).

(15) A manufacturing method for the film described in the above aspect (9) including a process of stretching a film containing the polymer material at a temperature in a range of (Tg 10) (Tg+30)° C. with respect to a glass transition temperature (Tg) of the film containing the polymer material.

(16) In the manufacturing method described in the above aspect (15), in the stretching process, the film containing the polymer material is stretched at a stretch ratio of 20-200%.

The present invention can also be structured as follows.

<1> A highly heat resistant polymer material contains at least one kind of a cellulose derivative containing a polymerization unit represented by the following general formula (2) and has a Tg of 180° C. or higher:

[Chemical Formula 4]

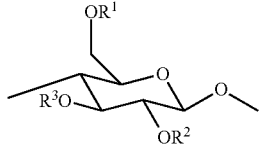

General Formula (2)

(in the general formula (2), $R^1$, $R^2$ and $R^3$ each independently include a trisubstituted organosilyl group having an aliphatic group or an unsaturated aliphatic group or an aromatic group, and include an aromatic acyl group).

<2> A transparent heat resistant plastic film containing the highly heat resistant polymer material described in the above aspect <1> has a haze of 2.00 or less.

<3> The transparent heat resistant plastic film described in the above aspect <2> is a phase difference film having an in-plane retardation Re (550) of 130 nm or more and 160 nm or less, a reverse wavelength dispersion (Re (450)/Re (550)) of 0.80 or more and 0.89 or less, a film thickness of 20 μm or more and 50 μm or less, and a photoelastic coefficient (K) of $5 \times 10^{-12}$ $m^2/N$ or more and $30 \times 10^{-12}$ $m^2/N$ or less. In the phase difference film, a substitution degree ($D_1$) of a trisubstituted organosilyl group having an aliphatic group or an unsaturated aliphatic group or an aromatic group in the cellulose derivative is 1.10 or more and 2.40 or less, a substitution degree ($D_2$) of an aromatic acyl group in the cellulose derivative is 0.10 or more and 1.90 or less, a total substitution degree ($D_3$) of an aromatic acyl group in the highly heat resistant polymer material is 0.10 or more and 0.40 or less, and the substitution degree ($D_1$) and the substitution degree ($D_2$) satisfy $D_1+D_2 \leq 3.0$.

<4> In the phase difference film described in the above aspect <3>, in the cellulose derivative, a trisubstituted organosilyl group of the general formula (2) contains at least one tertiary butyl group.

<5> In the phase difference film described in the above aspect <4>, in the cellulose derivative, a trisubstituted organosilyl group of the general formula (2) is a tertiary butyldimethylsilyl group.

<6> In the phase difference film described in the above aspect <5>, in the cellulose derivative, an aromatic acyl group of the general formula (2) has a 1 or 2-naphthoyl group.

<7> In the phase difference film described in the above aspect <6>, in the cellulose derivative, an aromatic acyl group of the general formula (2) has a 2-naphthoyl group.

<8> The phase difference film described in any one of the above aspects <1>-<7> is obtained by stretching a film-forming film containing the polymer material at a stretch ratio of 20% or more and a 200% or less.

<9> In the phase difference film described in the above aspect <8>, a temperature during the stretching is in a range of (Tg −10) ° C. or more and (Tg+30) ° C. or less with respect to a glass transition temperature (Tg) of the film-forming film.

<10> A circular polarizing plate including at least one sheet of the phase difference film described in the above aspects <1>-<9>.

<11> An image display apparatus including the circular polarizing plate described in the above aspect <10>.

<12> A manufacturing method for the phase difference film described in the above aspect <3> includes a process of stretching a film-forming film containing the highly heat resistant polymer material at a temperature in a range of (Tg−10) ° C. or more and (Tg+30) ° C. or less with respect to a glass transition temperature (Tg).

<13> In the manufacturing method described in claim 12 the above aspect <12>, in the stretching process, the film-forming film containing the highly heat resistant polymer material is stretched at a stretch ratio of 20% or more and 200% or less.

EXAMPLES

In the following, Examples of the present invention are described. However, the present invention is not limited to these Examples.

<1. Measurement Method>

Characteristic values and the like described in the present specification were obtained using the following evaluation methods.

(1) In-Plane Retardation and Reverse Wavelength Dispersion

An in-plane retardation (Re) and a wavelength dispersion characteristic were measured using OPTIPRO manufactured by Shintech Inc. The in-plane retardation adopted a numerical value measured at a measurement wavelength of 550 nm, and the wavelength dispersion characteristic (R450/R550) was calculated from a ratio of numerical values respectively measured at 450 nm and 550 nm.

(2) Thickness

A thickness was measured using an electronic micrometer manufactured by Anritsu Corporation.

(3) Glass Transition Temperature (Tg)

A glass transition temperature was measured using a thermal mechanical analyzer TMA-4000SA manufactured by Bruker AXS Corporation. Specifically, under a nitrogen atmosphere, a film was heated at 3° C./minute under a tensile load of 3 g applied to the film cut into 5 mm×20 mm. Tg was calculated by defining Tg as a temperature at an intersection point of two tangent lines before and after film elongation started in a chart in which the temperature was plotted on an X axis and an elongation percentage of the film was plotted on a Y axis.

(4) Photoelastic Coefficient

A photoelastic coefficient was measured using OPTIPRO manufactured by Shintech Inc. Specifically, a tensile load was applied to a film cut into 15 mm×60 mm, and changes in phase difference when the tensile load was changed 100 g at a time from 0 g to 1100 g were measured. A photoelastic coefficient was calculated by defining the photoelastic coefficient as a slope of a straight line in a plot obtained by plotting a stress calculated from a tensile load value on an X axis and plotting birefringence calculated from a measured phase difference value and a film thickness on a Y axis.

(5) Haze

Haze was measured using a haze meter (HZ-V3 manufactured by Suga Test Instruments Co., Ltd.).

(6) Number Average Molecular Weight and Weight Average Molecular Weight

Measurement was performed using a gel permeation chromatography (GPC) manufactured by Shimadzu Corporation. 3 mg of a sample was dissolved in 2 mL of chloroform; chloroform was used as a mobile phase; and a flow rate was set to 1.0 mL/minute. Measurement was performed at a column temperature of 40° C. using K-2006M and K-2001 manufactured by Shodex as a column. The number average molecular weight and the weight average molecular weight were calculated by converting each measurement data using a calibration curve prepared using a polystyrene standard sample.

(7) Substitution Degree

Quantification was performed using an integrated intensity of a spectrum attributed to each substituent group using 400 MHz-1 H-NMR manufactured by Bruker. Specifically, an introduction rate of an organosilyl group and an introduction rate of a second aliphatic group in the substitution degree ($D_1$) were respectively obtained from ratios of an integrated intensity of 3.1-5.2 ppm attributed to a proton on a cellulose ring to an integrated intensity of −0.3-1.2 ppm of a proton attributed to a first aliphatic group of an organosilyl group and an integrated intensity of 0.5-4.0 ppm of a proton attributed to a second aliphatic group. The same method was used for an acyl group in the substitution degree ($D_2$). In the case of an aromatic ring acyl group, it was obtained from a ratio of an integrated intensity of 3.1-5.2 ppm attributed to a proton on a cellulose ring to an integrated intensity of 6.8-9.0 ppm attributed to a proton on an aromatic ring of the acyl group. For a substitution degree of an aliphatic acyl group of a cellulose derivative 16 described in Comparative Example 4, a manufacturer's published value was directly used as the substitution degree ($D_2$).

<2. Cellulose Derivative>

In the following, specific synthesis methods of cellulose derivatives are described.

Synthesis Example 1

Cellulose Derivative 1: Synthesis of TBDMS Cellulose-2-Naphthoate: $D_1$=1.58, $D_2$=0.20

Powdered cellulose W-50G (24.3 g: 150 mmol) and lithium chloride (38.15 g: 900 mmol) manufactured by Nippon Paper Chemicals Co., Ltd. were weighed and charged into a four-neck reactor. Thereafter, to the 4-neck reactor, a stirring bar with a crescent spatula was installed, and a Dimroth condenser tube, a dropping funnel, a thermocouple and a calcium chloride tube were attached. Subsequently, N,N-dimethylacetamide (450 mL) was charged and the mixture was heated and stirred at 150° C. for 2 hours, and thereafter, the mixture was naturally cooled to a room temperature to obtain a homogeneous solution of cellulose.

N,N-dimethylaminopyridine (1.83 g: 15 mmol) and triethylamine (39.46 g: 390 mmol) were added to the homogeneous solution. Further, tertiary butyldimethylchlorosilane (58.78 g: 390 mmol) dissolved in N,N-dimethylacetamide (150 mL) was added dropwise from the dropping funnel under stirring and the mixture was stirred at a room temperature for 5 hours.

After stopping reaction by adding methanol (1000 mL), the reaction solution was added dropwise into 900 mL of methanol and the mixture was stirred to generate a white precipitate, and the white precipitate was filtered. The operation of dropwise addition, stirring and filtration was repeated three times, and thereafter, vacuum-drying was performed at 80° C. for 5 hours using a vacuum oven. An obtained product was analyzed using 400 MHz-$^1$H-NMR manufactured by Bruker and was confirmed to be a target cellulose silyl ether, and a substitution degree was calculated, and the result was $D_1$=1.58 (molar yield: 81%, yield: 41.85 g).

Subsequently, the cellulose silyl ether (20.8 g: 60 mol) was weighed and charged into a four-neck reactor. Thereafter, to the 4-neck reactor, a stirring bar with a crescent spatula was installed, and a Dimroth condenser tube, a dropping funnel, a thermocouple and a calcium chloride tube were attached. Subsequently, pyridine (300 mL) was added and thereafter, under heating at 80° C., the mixture was stirred with a stirring bar until the cellulose silyl ether was dissolved. After confirming that the solution had become transparent, 2-naphthoyl chloride (5.38 g: 28.2 mmol) dissolved in pyridine (20 mL) was added dropwise at 80° C. After the dropwise addition, the mixture was stirred with a stirring bar for 5 hours, and thereafter, the reaction solution was added dropwise into 1,000 mL of methanol and the mixture was stirred to prepare a homogeneous solution. An operation in which the homogeneous solution was added dropwise to 1000 mL of methanol and the mixture was stirred was repeated three times to obtain a white precipitate. Next, the white precipitate was vacuum-dried at 80° C. for 5 hours using a vacuum oven to obtain a target powdered cellulose derivative 1 (molar yield: 93%, yield: 21.0 g).

The cellulose derivative 1 was analyzed using 400 MHz-$^1$H-NMR manufactured by Bruker and was confirmed to be a target cellulose derivative, and the substitution degrees were calculated, and the results were $D_1$=1.58 and $D_2$=0.20.

Synthesis Example 2

Cellulose Derivative 2: Synthesis of TBDMS Cellulose-2-Naphthoate: $D_1$=1.58, $D_2$=0.21

A target cellulose derivative 2 was obtained using the same method as Synthesis Example 1 except that 2-naphthoyl chloride (5.72 g: 30 mmol) was used (molar yield: 99%, yield: 22.44 g).

The cellulose derivative 2 was analyzed using 400 MHz-$^1$H-NMR manufactured by Bruker and was confirmed to be a target cellulose derivative, and the substitution degrees were calculated, and the results were $D_1$=1.58 and $D_2$=0.21.

Synthesis Example 3

Cellulose Derivative 3: Synthesis of TBDMS Cellulose-2-Naphthoate: $D_1=1.59$, $D_2=0.17$ A target cellulose derivative 3 was obtained using the same method as Synthesis Example 1 except that 2-naphthoyl chloride (5.15 g: 27 mmol) was used (molar yield: 99%, yield: 22.66 g).

The cellulose derivative 3 was analyzed using 400 MHz-$^1$H-NMR manufactured by Bruker and was confirmed to be a target cellulose derivative, and the substitution degrees were calculated, and the results were $D_1=1.59$ and $D_2=0.17$.

Synthesis Example 4

Cellulose Derivative 4: Synthesis of TBDMS Cellulose-2-Naphthoate: $D_1=1.59$, $D_2=0.24$ A target cellulose derivative 4 was obtained using the same method as Synthesis Example 1 except that 2-naphthoyl chloride (5.72 g: 30 mmol) was used (molar yield: 95%, yield: 21.75 g).

The cellulose derivative 4 was analyzed using 400 MHz-$^1$H-NMR manufactured by Bruker and was confirmed to be a target cellulose derivative, and the substitution degrees were calculated, and the results were $D_1=1.59$ and $D_2=0.24$.

Synthesis Example 5

Cellulose Derivative 5: Synthesis of TBDMS Cellulose-2-Naphthoate: $D_1=1.60$, $D_2=0.14$ A target cellulose derivative 5 was obtained using the same method as Synthesis Example 1 except that powdered cellulose W-400G manufactured by Nippon Paper Chemicals Co., Ltd. was used as a cellulose raw material, and 2-naphthoyl chloride (4.28 g: 22.5 mmol) was used (molar yield: 99%, yield: 21.81 g).

The cellulose derivative 5 was analyzed using 400 MHz-$^1$H-NMR manufactured by Bruker and was confirmed to be a target cellulose derivative, and the substitution degrees were calculated, and the results were $D_1=1.60$ and $D_2=0.14$.

Synthesis Example 6

Cellulose Derivative 6: Synthesis of TBDMS Cellulose-2-Naphthoate: $D_1=1.58$, $D_2=0.24$ A target cellulose derivative 6 was obtained using the same method as Synthesis Example 4 except that powdered cellulose W-400G manufactured by Nippon Paper Chemicals Co., Ltd. was used as a cellulose raw material (molar yield: 99%, yield: 22.59 g).

The cellulose derivative 6 was analyzed using 400 MHz-$^1$H-NMR manufactured by Bruker and was confirmed to be a target cellulose derivative, and the substitution degrees were calculated, and the results were $D_1=1.58$ and $D_2=0.24$.

Synthesis Example 7

Cellulose Derivative 7: Synthesis of TIPS Cellulose-2-Naphthoate: $D_1=1.10$, $D_2=0.21$ A target cellulose derivative 7 was obtained using the same method as Synthesis Example 2 except that triisopropylchlorosilane (75.19 g: 390 mmol) was used as a silylating agent (molar yield: 99%, yield: 21.79 g).

The cellulose derivative 7 was analyzed using 400 MHz-$^1$H-NMR manufactured by Bruker and was confirmed to be a target cellulose derivative, and the substitution degrees were calculated, and the results were $D_1=1.10$ and $D_2=0.21$.

Synthesis Example 8

Cellulose Derivative 8: Synthesis of THDMS Cellulose-2-Naphthoate: $D_1=1.68$, $D_2=0.20$ A target cellulose derivative 8 was obtained using the same method as Synthesis Example 1 except that powdered cellulose W-400G manufactured by Nippon Paper Chemicals Co., Ltd. was used as a cellulose raw material, and tertiary hexyldimethylchlorosilane (67.04 g: 375 mmol) was used as a silylating agent (molar yield: 93%, yield: 24.15 g).

The cellulose derivative 8 was analyzed using 400 MHz-$^1$H-NMR manufactured by Bruker and was confirmed to be a target cellulose derivative, and the substitution degrees were calculated, and the results were $D_1=1.68$ and $D_2=0.20$.

Synthesis Example 9

Cellulose Derivative 9: Synthesis of TBDMS Cellulose Benzoate: $D_1=1.58$, $D_2=0.40$ A target cellulose derivative 9 was obtained using the same method as Synthesis Example 1 except that powdered cellulose W-400G manufactured by Nippon Paper Chemicals Co., Ltd. was used as a cellulose raw material, and benzoyl chloride (109.64 g: 780 mmol) was used as an acylating agent(molar yield: 96%, yield: 22.18 g).

The cellulose derivative 9 was analyzed using 400 MHz-$^1$H-NMR manufactured by Bruker and was confirmed to be a target cellulose derivative, and the substitution degrees were calculated, and the results were $D_1=1.58$ and $D_2=0.40$.

Synthesis Example 10

Cellulose Derivative 10: Synthesis of TBDMS Cellulose Methyl Ether: $D_1=2.30$, $D_2=0$ Methyl cellulose SM-15 (9.36 g: 50 mmol, $D_1=1.80$, manufactured by Shin-Etsu Chemical Co., Ltd.) as cellulose ether was weighed and charged into a 4-neck reactor. Next, to the 4-neck reactor, a stirring bar with a crescent spatula was installed, and a Dimroth condenser tube, a dropping funnel, a thermocouple and a nitrogen-filled balloon were attached, and nitrogen substitution was performed in the 4-neck reactor.

Pyridine (201 mL: 2500 mmol) was added, and thereafter, under heating at 80° C., the mixture was stirred with a magnetic stirrer (2000 rpm) until the methyl cellulose was dissolved.

After confirming that the solution had become transparent, tertiary butyldimethylchlorosilane (6.18 g: 41 mmol) dissolved in 100 mL of pyridine was added dropwise. After the dropwise addition, the mixture was stirred for 5 hours, and thereafter, the reaction solution was added dropwise into 500 mL of methanol and the mixture was stirred to prepare a homogeneous solution. The homogeneous solution was added dropwise to 1 L of pure water and the mixture was stirred to generate a white precipitate. The white precipitate was filtered, and was washed again with 1 L of pure water with stirring.

Next, a process in which the white precipitate was washed with 500 mL of methanol and was filtered was performed twice. Thereafter, the white precipitate was vacuum-dried at 60° C. for 5 hours using a vacuum oven to obtain a target powdered cellulose derivative 10 (molar yield: 90%, yield: 11.01 g).

The cellulose derivative 10 was analyzed using 400 MHz-$^1$H-NMR manufactured by Bruker and was confirmed to be a target cellulose derivative, and the substitution degrees were calculated, and the results were $D_1$=2.30 and $D_2$=0. Breakdown of $D_1$ is as follows: a substitution degree due to a TBDMS group is 1.80, and a substitution degree due to a methyl group is 0.50.

Synthesis Example 11

Cellulose Derivative 11: Synthesis of TBDMS Cellulose Methyl Ether-2-Naphthoate: $D_1$=2.30, $D_2$=0.20

The cellulose derivative 10 (9.78 g: 40 mmol) prepared using the method described in Synthesis Example 10 was weighed and charged into a 4-neck reactor. Thereafter, to the 4-neck reactor, a stirring bar with a crescent spatula was installed, and a Dimroth condenser tube, a dropping funnel, a thermocouple and a calcium chloride tube were attached. Subsequently, pyridine (201 mL: 2500 mmol) was added and thereafter, under heating at 80° C., the mixture was stirred with a stirring bar until the cellulose silyl ether was dissolved. After confirming that the solution had become transparent, 2-naphthoyl chloride (3.53 g: 18.8 mmol) dissolved in pyridine (20 mL) was added dropwise at 80° C. After the dropwise addition, the mixture was stirred with a stirring bar for 5 hours, and thereafter, the reaction solution was added dropwise into 1,000 mL of methanol and the mixture was stirred to prepare a homogeneous solution. An operation in which the homogeneous solution was added dropwise to 1000 mL of methanol and the mixture was stirred was repeated three times to obtain a white precipitate. Next, the white precipitate was vacuum-dried at 80° C. for 5 hours using a vacuum oven to obtain a target powdered cellulose derivative 11 (molar yield: 99%, yield: 10.91 g).

The cellulose derivative 11 was analyzed using 400 MHz-$^1$H-NMR manufactured by Bruker and was confirmed to be a target cellulose derivative, and the substitution degrees were calculated, and the results were $D_1$=2.30 and $D_2$=0.20. Breakdown of $D_1$ is as follows: a substitution degree due to a TBDMS group is 1.80, and a substitution degree due to a methyl group is 0.50.

Synthesis Example 12

Cellulose Derivative 12: Synthesis of TMS Cellulose-2-Naphthoate: $D_1$=2.34, $D_2$=0.46

A target cellulose derivative 12 was obtained using the same method as Synthesis Example 1 except that trimethylchlorosilane (62.71 g: 577 mmol) as a silylating agent and 2-naphthoyl chloride (170.99 g: 897 mmol) were used (molar yield: 99%, yield: 23.94 g).

The cellulose derivative 12 was analyzed using 400 MHz-$^1$H-NMR manufactured by Bruker and was confirmed to be a target cellulose derivative, and the substitution degrees were calculated, and the results were $D_1$=2.34 and $D_2$=0.46.

Synthesis Example 13

Cellulose Derivative 13: Synthesis of Ethyl Cellulose-2-Naphthoate: $D_1$=2.60, $D_2$=0.40

Ethyl cellulose MED-70 (11.74 g: 50 mmol, $D_1$=2.60) manufactured by Dow Chemical Company was weighed as cellulose ether and was charged into a 4-neck reactor. Next, to the 4-neck reactor, a magnetic stirrer was charged, and a Dimroth condenser tube, a dropping funnel, a thermocouple and a nitrogen-filled balloon were attached, and nitrogen substitution was performed in the 4-neck reactor.

Pyridine (201 mL: 2500 mmol) was added, and thereafter, under heating at 80° C., the mixture was stirred with a magnetic stirrer (2000 rpm) until the ethyl cellulose was dissolved.

After confirming that the solution had become transparent, 2-naphthoyl chloride (47.7 g: 250 mmol) manufactured by Wako Pure Chemical Industries, Ltd. dissolved in 100 mL of 1,4-dioxane was added dropwise. After the dropwise addition, the mixture was stirred for 8 hours, and thereafter, the reaction solution was added dropwise into 500 mL of methanol and the mixture was stirred to prepare a homogeneous solution. The homogeneous solution was added dropwise to 1 L of pure water and the mixture was stirred to generate a white precipitate. The white precipitate was filtered, and was washed again with 1 L of pure water with stirring.

Next, a process in which the white precipitate was washed with 500 mL of methanol and was filtered was performed twice. Thereafter, the white precipitate was vacuum-dried at 60° C. for 5 hours using a vacuum oven to obtain a target powdered cellulose derivative 13 (molar yield: 87%, yield: 12.87 g).

The cellulose derivative 13 was analyzed using 400 MHz-$^1$H-NMR manufactured by Bruker and was confirmed to be a target cellulose derivative, and the substitution degrees were calculated, and the results were $D_1$=2.60 and $D_2$=0.40.

Synthesis Example 14

Cellulose Derivative 14: Synthesis of ethyl cellulose-2-naphthoate: $D_1$=2.37, $D_2$=0.62

A target powdered cellulose derivative 14 was obtained using the same method as Synthesis Example 12 except that ethyl cellulose MED-50 (11.42 g: 50 mmol, $D_1$=2.37) manufactured by Dow Chemical Company was used as cellulose ether (molar yield: 93%, yield: 15.11 g).

The cellulose derivative 14 was analyzed using 400 MHz-$^1$H-NMR manufactured by Bruker and was confirmed to be a target cellulose derivative, and the substitution degrees were calculated, and the results were $D_1$=2.37 and $D_2$=0.62.

Synthesis Example 15

Cellulose Derivative 15: Synthesis of Cellulose Benzoate: $D_2$=2.17

Powdered cellulose W-400G (10.00 g: 70.92 mmol) manufactured by Nippon Paper Chemicals Co., Ltd. was used as a cellulose raw material, and benzoyl chloride (35.89 g: 255 mmol) was added dropwise over 10 minutes to a mixed solution of dioxane (63.43 mL) and pyridine (14.63 g: 164 mmol), and the mixture was stirred under reflux conditions for 3 hours. After completion of the reaction, 400 mL of methanol was added dropwise, and a product was precipitated and was vacuum-dried at 80° C. for 6 hours to obtain a target cellulose derivative 15 (molar yield: 26.8%, yield: 5.85 g).

The cellulose derivative 15 was analyzed using 400 MHz-$^1$H-NMR manufactured by Bruker and was confirmed to be a target cellulose derivative, and the substitution degrees were calculated, and the results were $D_1$=0 and $D_2$=2.17.

(Cellulose Derivative 16: Preparation of Cellulose Acetate Butyrate: $D_2$=2.70)

Cellulose acetate butyrate (CAB381-20) manufactured by Eastman Chemical Corporation was prepared and was used as a cellulose derivative 16. For the value of $D_2$, a manufacturer's published value was adopted.

<3. Film-Forming Film>

In the following, methods for producing film-forming films using the above-described cellulose derivatives are described.

Film-Forming Film Example 1

Preparation of Film 1: $D_3$=0.20

The cellulose derivative 1 was dissolved in methylene chloride superhydride (manufactured by Wako Pure Chemical Industries, Ltd.) to prepare a 1 wt % diluted solution. Next, insoluble matter was filtered from the diluted solution by suction filtration using a hard filter paper No. 4 manufactured by Advantech Co., Ltd., and the diluted solution was concentrated using an evaporator to obtain a 10 wt % coating solution.

The coating solution was cast onto a biaxially stretched polyethylene terephthalate film (hereinafter referred to as a PET film) and thereafter, the coating solution was applied in a form of a uniform film using a bar coater such that a thickness after drying was about 50-60 μm.

The film was dried in dry atmosphere at 80° C. for 5 minutes, in a dry atmosphere at 100° C. for 5 minutes and in a dry atmosphere at 120° C. for 10 minutes to remove methylene chloride. After drying, the obtained film was peeled off from the PET film. The obtained film was fixed on an aluminum frame of 500 mm×300 mm and was dried in a dry atmosphere at 110° C. for 15 minutes to remove film residual methylene chloride, and the film was referred to as a film 1. A glass transition temperature of the film 1 was measured and the result was 219° C.

Film-Forming Film Example 2

Preparation of Film 2: $D_3$=0.21

A film was prepared using the same method as the film-forming film example 1 except that the cellulose derivative 2 was used, and the film was referred to as a film 2. A glass transition temperature of the film 2 was measured and the result was 214° C.

Film-Forming Film Example 3

Preparation of Film 3: $D_3$=0.17

A film was prepared using the same method as the film-forming film example 1 except that the cellulose derivative 3 was used, and the film was referred to as a film 3. A glass transition temperature of the film 3 was measured and the result was 224° C.

Film-Forming Film Example 4

Preparation of Film 4: $D_3$=0.24

A film was prepared using the same method as the film-forming film example 1 except that the cellulose derivative 4 was used, and the film was referred to as a film 4. A glass transition temperature of the film 4 was measured and the result was 224° C.

Film-Forming Film Example 5

Preparation of Film 5: $D_3$=0.14

A film was prepared using the same method as the film-forming film example 1 except that the cellulose derivative 5 was used, and the film was referred to as a film 5. A glass transition temperature of the film 5 was measured and the result was 207° C.

Film-Forming Film Example 6

Preparation of Film 6: $D_3$=0.24

A film was prepared using the same method as the film-forming film example 1 except that the cellulose derivative 6 was used, and the film was referred to as a film 6. A glass transition temperature of the film 6 was measured and the result was 204° C.

Film-Forming Film Example 7

Preparation of Film 7: $D_3$=0.21

A film was prepared using the same method as the film-forming film example 1 except that the cellulose derivative 7 was used, and the film was referred to as a film 7. A glass transition temperature of the film 7 was measured and the result was 210° C.

Film-Forming Film Example 8

Preparation of Film 8: $D_3$=0.20

A film was prepared using the same method as the film-forming film example 1 except that the cellulose derivative 8 was used, and the film was referred to as a film 8. A glass transition temperature of the film 8 was measured and the result was 214° C.

Film-Forming Film Example 9

Preparation of Film 9: $D_3$=0.40

A film was prepared using the same method as the film-forming film example 1 except that the cellulose derivative 9 was used, and the film was referred to as a film 9. A glass transition temperature of the film 9 was measured and the result was 227° C.

Film-Forming Film Example 10

Preparation of Film 10: $D_3$=0

A film was prepared using the same method as the film-forming film example 1 except that the cellulose derivative 10 was used, and the film was referred to as a film 10. A glass transition temperature of the film 10 was measured and the result was 225° C.

Film-Forming Film Example 11

Preparation of Film 11: $D_3=0.20$

A film was prepared using the same method as the film-forming film example 1 except that the cellulose derivative 11 was used, and the film was referred to as a film 11. A glass transition temperature of the film 11 was measured and the result was 215° C.

Film-Forming Film Example 12

Preparation of Film 12: $D_3=0.46$

A film was prepared using the same method as the film-forming film example 1 except that the cellulose derivative 12 was used, and the film was referred to as a film 12. A glass transition temperature of the film 12 was measured and the result was 173° C.

Film-Forming Film Example 13

Preparation of Film 13: $D_3=0.19$

A film 13 was prepared by applying the same method as the film-forming film example 1 except that a resin ($D_3=0.19$) obtained by mixing the cellulose derivative 3 ($D_2=0.17$) and the cellulose derivative 4 ($D_2=0.24$) at a ratio of 7:3 by weight was used. A glass transition temperature of the film 13 was measured and the result was 221° C.

Film-Forming Film Example 14

Preparation of Film 14: $D_3=0.20$

A film 14 was prepared by applying the same method as the film-forming film example 1 except that a resin ($D_3=0.20$) obtained by mixing the cellulose derivative 3 ($D_2=0.17$) and the cellulose derivative 4 ($D_2=0.24$) at a ratio of 6:4 by weight was used. A glass transition temperature of the film 14 was measured and the result was 220° C.

Film-Forming Film Example 15

Preparation of Film 15: $D_3=0.21$

A film 15 was prepared by applying the same method as the film-forming film example 1 except that a resin ($D_3=0.21$) obtained by mixing the cellulose derivative 3 ($D_2=0.17$) and the cellulose derivative 4 ($D_2=0.24$) at a ratio of 5:5 by weight was used. A glass transition temperature of the film 15 was measured and the result was 220° C.

Film-Forming Film Example 16

Preparation of Film 16: $D_3=0.17$

A film 16 was prepared by applying the same method as the film-forming film example 1 except that a resin ($D_3=0.17$) obtained by mixing the cellulose derivative 5 ($D_2=0.14$) and the cellulose derivative 6 ($D_2=0.24$) at a ratio of 3:1 by weight was used. A glass transition temperature of the film 16 was measured and the result was 207° C.

Film-Forming Film Example 17

Preparation of Film 17: $D_3=0.40$

A film was prepared using the same method as the film-forming film example 1 except that the cellulose derivative 13 was used, and the film was referred to as a film 17. A glass transition temperature of the film 17 was measured and the result was 145° C.

Film-Forming Film Example 18

Preparation of Film 18: $D_3=0.62$

A film was prepared using the same method as the film-forming film example 1 except that the cellulose derivative 14 was used, and the film was referred to as a film 18. A glass transition temperature of the film 18 was measured and the result was 145° C.

Film-Forming Film Example 19

Preparation of Film 19: $D_3=2.17$

A film was prepared using the same method as the film-forming film example 1 except that the cellulose derivative 15 was used, and the film was referred to as a film 19. A glass transition temperature of the film 19 was measured and the result was 170° C.

Film-Forming Film Example 20

Preparation of Film 20: $D_3=2.70$

A film was prepared using the same method as the film-forming film example 1 except that the cellulose derivative 16 (cellulose acetate butyrate: CAB381-20 manufactured by Eastman Chemical Corporation) was used, and the film was referred to as a film 20. A glass transition temperature of the film 20 was measured and the result was 141° C.

Film-Forming Film Example 21

Preparation of Film 21: $D_3=0.42$

A film 21 was prepared by applying the same method as the film-forming film example 1 except that a resin ($D_3=0.42$) obtained by mixing the cellulose derivative 13 ($D_2=0.40$) and the cellulose derivative 14 ($D_2=0.62$) at a ratio of 9:1 by weight was used. A glass transition temperature of the film 21 was measured and the result was 145° C.

Film-Forming Film Example 22

Preparation of Film 22: $D_3=0.44$

A film 22 was prepared by applying the same method as the film-forming film example 1 except that a resin ($D_3=0.44$) obtained by mixing the cellulose derivative 13 ($D_2=0.40$) and the cellulose derivative 14 ($D_2=0.62$) at a ratio of 8:2 by weight was used. A glass transition temperature of the film 22 was measured and the result was 145° C.

Film-Forming Film Example 23

Preparation of Film 23: $D_3=0.46$

A film 23 was prepared by applying the same method as the film-forming film example 1 except that a resin ($D_3=0.46$) obtained by mixing the cellulose derivative 13 ($D_2=0.40$) and the cellulose derivative 14 ($D_2=0.62$) at a ratio of 7:3 by weight was used. A glass transition temperature of the film 23 was measured and the result was 145° C.

<4. Stretched Film>

In the following, methods for producing stretched films using the above-described film-forming films are described.

Example 1

The film 1 was subjected to 50% free-end uniaxial stretching at 229° C. A film of 50 mm 40 mm was cut out from a center portion of the stretched film and was used for measurement. The results are shown in Table 1.

Example 2

The film 2 was subjected to 50% free-end uniaxial stretching at 224° C. A film of 50 mm×40 mm was cut out from a center portion of the stretched film and was used for measurement. The results are shown in Table 1.

Example 3

The film 3 was subjected to 100% free-end uniaxial stretching at 234° C. A film of 50 mm×40 mm was cut out from a center portion of the stretched film and was used for measurement. The results are shown in Table 1.

Example 4

The film 4 was subjected to 100% free-end uniaxial stretching at 234° C. A film of 50 mm×40 mm was cut out from a center portion of the stretched film and was used for measurement. The results are shown in Table 1.

Example 5

The film 5 was subjected to 60% free-end uniaxial stretching at 228° C. A film of 50 mm×40 mm was cut out from a center portion of the stretched film and was used for measurement. The results are shown in Table 1.

Example 6

The film 6 was subjected to 60% free-end uniaxial stretching at 224° C. A film of 50 mm×40 mm was cut out from a center portion of the stretched film and was used for measurement. The results are shown in Table 1.

Example 7

The film 7 was subjected to 50% free-end uniaxial stretching at 220° C. A film of 50 mm×40 mm was cut out from a center portion of the stretched film and was used for measurement. The results are shown in Table 1.

Example 8

The film 8 was subjected to 50% free-end uniaxial stretching at 234° C. A film of 50 mm×40 mm was cut out from a center portion of the stretched film and was used for measurement. The results are shown in Table 1.

Example 9

The film 9 was subjected to 50% free-end uniaxial stretching at 247° C. A film of 50 mm×40 mm was cut out from a center portion of the stretched film and was used for measurement. The results are shown in Table 1.

Example 10

The film 10 was subjected to 20% free-end uniaxial stretching at 230° C. A film of 50 mm×40 mm was cut out from a center portion of the stretched film and was used for measurement. The results are shown in Table 1.

Example 11

The film 11 was subjected to 50% free-end uniaxial stretching at 235° C. A film of 50 mm×40 mm was cut out from a center portion of the stretched film and was used for measurement. The results are shown in Table 1.

Example 12

The film 12 was subjected to 50% free-end uniaxial stretching at 183° C. A film of 50 mm×40 mm was cut out from a center portion of the stretched film and was used for measurement. The results are shown in Table 1.

Example 13

The film 13 was subjected to 100% free-end uniaxial stretching at 241° C. A film of 50 mm×40 mm was cut out from a center portion of the stretched film and was used for measurement. The results are shown in Table 1.

Example 14

The film 14 was subjected to 100% free-end uniaxial stretching at 240° C. A film of 50 mm×40 mm was cut out from a center portion of the stretched film and was used for measurement. The results are shown in Table 1.

Example 15

The film 15 was subjected to 100% free-end uniaxial stretching at 230° C. A film of 50 mm×40 mm was cut out from a center portion of the stretched film and was used for measurement. The results are shown in Table 1.

Example 16

The film 16 was subjected to 60% free-end uniaxial stretching at 227° C. A film of 50 mm×40 mm was cut out from a center portion of the stretched film and was used for measurement. The results are shown in Table 1.

Comparative Example 1

The film 17 was subjected to 50% free-end uniaxial stretching at 155° C. A film of 50 mm×40 mm was cut out from a center portion of the stretched film and was used for measurement. The results are shown in Table 2.

Comparative Example 2

The film 18 was subjected to 50% free-end uniaxial stretching at 155° C. A film of 50 mm×40 mm was cut out from a center portion of the stretched film and was used for measurement. The results are shown in Table 2.

Comparative Example 3

The film 19 was subjected to 50% free-end uniaxial stretching at 200° C. A film of 50 mm×40 mm was cut out from a center portion of the stretched film and was used for measurement. The results are shown in Table 2.

Comparative Example 4

The film 20 was subjected to 50% free-end uniaxial stretching at 151° C. A film of 50 mm×40 mm was cut out from a center portion of the stretched film and was used for measurement. The results are shown in Table 2.

Comparative Example 5

The film 21 was subjected to 50% free-end uniaxial stretching at 155° C. A film of 50 mm×40 mm was cut out from a center portion of the stretched film and was used for measurement. The results are shown in Table 2.

Comparative Example 6

The film 22 was subjected to 50% free-end uniaxial stretching at 155° C. A film of 50 mm×40 mm was cut out from a center portion of the stretched film and was used for measurement. The results are shown in Table 2.

Comparative Example 7

The film 23 was subjected to 50% free-end uniaxial stretching at 155° C. A film of 50 mm×40 mm was cut out from a center portion of the stretched film and was used for measurement. The results are shown in Table 2.

Reference Example 1

The film 1 was subjected to 50% free-end uniaxial stretching at 199° C. A film of 50 mm×40 mm was cut out from a center portion of the stretched film and was used for measurement. The results are shown in Table 2. In the present example, the stretching temperature of the film is lower than the preferable range.

Reference Example 2

The film 1 was subjected to 10% free-end uniaxial stretching at 229° C. A film of 50 mm×40 mm was cut out from a center portion of the stretched film and was used for measurement. The results are shown in Table 2. In the present example, the stretch ratio of the film is lower than the preferable range.

TABLE 1

|  |  | Example 1 | Example 2 | Example 3 | Example 4 | Example 5 | Example 6 |
|---|---|---|---|---|---|---|---|
| Component 1 | Cellulose derivative | Derivative 1 | Derivative 2 | Derivative 3 | Derivative 4 | Derivative 5 | Derivative 6 |
|  | Silyl group | TBDMS | TBDMS | TBDMS | TBDMS | TBDMS | TBDMS |
|  | Aliphatic group | — | — | — | — | — | — |
|  | Acyl group 1 | 2-naphthoyl | 2-naphthoyl | 2-naphthoyl | 2-naphthoyl | 2-naphthoyl | 2-naphthoyl |
|  | Acyl group 2 | — | — | — | — | — | — |
|  | D1 | 1.58 | 1.58 | 1.59 | 1.59 | 1.60 | 1.58 |
|  | D2 | 0.20 | 0.21 | 0.17 | 0.24 | 0.14 | 0.24 |
|  | D1 + D2 | 1.78 | 1.79 | 1.76 | 1.83 | 1.74 | 1.82 |
| Component 2 | Cellulose derivative | — | — | — | — | — | — |
|  | Silyl group | — | — | — | — | — | — |
|  | Aliphatic group | — | — | — | — | — | — |
|  | Acyl group 1 | — | — | — | — | — | — |
|  | Acyl group 2 | — | — | — | — | — | — |
|  | D1 | — | — | — | — | — | — |
|  | D2 | — | — | — | — | — | — |
|  | D1 + D2 | — | — | — | — | — | — |
| Acyl group total substitution degree D3 |  | 0.20 | 0.21 | 0.17 | 0.24 | 0.14 | 0.24 |
| Component 1:component 2 (weight ratio) |  | Component 1 only | Component 1 only | Component 1 only | Component 1 only | Component 1 only | Component 1 only |
| Film-forming film |  | Film 1 | Film 2 | Film 3 | Film 4 | Film 5 | Film 6 |
| Glass transition temperature (Tg) |  | 219 | 214 | 224 | 224 | 207 | 204 |
| Number average molecular weight (Mn) |  | 196,000 | 197,000 | 194,000 | 195,000 | 72,000 | 68,000 |
| Weight average molecular weight (Mw) |  | 234,000 | 236,000 | 236,000 | 230,000 | 158,000 | 152,000 |
| Stretching conditions | Ratio (%) | 50 | 50 | 100 | 100 | 60 | 60 |
|  | Temperature (° C.) | 229 | 224 | 234 | 234 | 228 | 224 |
| Stretched film | Thickness (μm) | 50 | 50 | 35 | 39 | 43 | 43 |
|  | Re (550) (nm) | 134 | 144 | 269 | 120 | 232 | 88 |
|  | Re (450)/Re (550) | 0.86 | 0.81 | 0.96 | 0.72 | 0.96 | 0.76 |
|  | K (×$10^{-12}$ m$^2$/N) | 9.0 | 9.0 | 10.1 | 19.0 | 10.2 | 18.3 |

TABLE 1-continued

| | | | | | | |
|---|---|---|---|---|---|---|
| Haze (%) | 0.69 | 0.41 | 0.56 | 0.45 | 0.84 | 0.85 |

| | | Example 7 | Example 8 | Example 9 | Example 10 | Example 11 |
|---|---|---|---|---|---|---|
| Component 1 | Cellulose derivative | Derivative 7 | Derivative 8 | Derivative 9 | Derivative 10 | Derivative 11 |
| | Silyl group | TIPS | THDMS | TBDMS | TBDMS | TBDMS |
| | Aliphatic group | — | — | — | Methyl | Methyl |
| | Acyl group 1 | 2-naphthoyl | 2-naphthoyl | Benzoyl | — | 2-naphthoyl |
| | Acyl group 2 | — | — | — | — | — |
| | D1 | 1.10 | 1.68 | 1.58 | 230 *1) | 2.30 *1) |
| | D2 | 0.21 | 0.20 | 0.40 | — | 0.20 |
| | D1 + D2 | 1.31 | 1.88 | 1.98 | 2.30 | 2.50 |
| Component 2 | Cellulose derivative | — | — | — | — | — |
| | Silyl group | — | — | — | — | — |
| | Aliphatic group | — | — | — | — | — |
| | Acyl group 1 | — | — | — | — | — |
| | Acyl group 2 | — | — | — | — | — |
| | D1 | — | — | — | — | — |
| | D2 | — | — | — | — | — |
| | D1 + D2 | — | — | — | — | — |
| Acyl group total substitution degree D3 | | 0.21 | 0.20 | 0.40 | 0 | 0.20 |
| Component 1:component 2 (weight ratio) | | Component 1 only | Component 1 only | Component 1 only | Component 1 only | Component 1 only |
| Film-forming film | | Film 7 | Film 8 | Film 9 | Film 10 | Film 11 |
| Glass transition temperature (Tg) | | 210 | 214 | 227 | 225 | 215 |
| Number average molecular weight (Mn) | | 195,000 | 68,000 | 49,000 | 59,000 | 54,000 |
| Weight average molecular weight (Mw) | | 230,000 | 142,000 | 138,000 | 125,000 | 137,000 |
| Stretching conditions | Ratio (%) | 50 | 50 | 50 | 20 | 50 |
| | Temperature (° C.) | 220 | 234 | 247 | 230 | 235 |
| Stretched film | Thickness (μm) | 45 | 48 | 43 | 23 | 40 |
| | Re (550) (nm) | 142 | 140 | 135 | 140 | 139 |
| | Re (450)/Re (550) | 0.85 | 0.86 | 0.89 | 0.99 | 0.83 |
| | K (×10$^{-12}$ m$^2$/N) | 15.0 | 16.2 | 45.0 | 5.0 | 14.0 |
| | Haze (%) | 1.13 | 1.02 | 0.98 | 1.50 | 1.00 |

| | | Example 12 | Example 13 | Example 14 | Example 15 | Example 16 |
|---|---|---|---|---|---|---|
| Component 1 | Cellulose derivative | Derivative 12 | Derivative 3 | Derivative 3 | Derivative 3 | Derivative 5 |
| | Silyl group | TMS | TBDMS | TBDMS | TBDMS | TBDMS |
| | Aliphatic group | — | — | — | — | — |
| | Acyl group 1 | 2-naphthoyl | 2-naphthoyl | 2-naphthoyl | 2-naphthoyl | 2-naphthoyl |
| | Acyl group 2 | — | — | — | — | — |
| | D1 | 2.34 | 1.59 | 1.59 | 1.59 | 1.60 |
| | D2 | 0.46 | 0.17 | 0.17 | 0.17 | 0.14 |
| | D1 + D2 | 2.80 | 1.76 | 1.76 | 1.76 | 1.74 |
| Component 2 | Cellulose derivative | — | Derivative 4 | Derivative 4 | Derivative 4 | Derivative 6 |
| | Silyl group | — | TBDMS | TBDMS | TBDMS | TBDMS |
| | Aliphatic group | — | — | — | — | — |
| | Acyl group 1 | — | 2-naphthoyl | 2-naphthoyl | 2-naphthoyl | 2-naphthoyl |
| | Acyl group 2 | — | — | — | — | — |
| | D1 | — | 1.59 | 1.59 | 1.59 | 1.58 |
| | D2 | — | 0.24 | 0.24 | 0.24 | 0.24 |
| | D1 + D2 | — | 1.83 | 1.83 | 1.83 | 1.82 |
| Acyl group total substitution degree D3 | | 0.46 | 0.19 | 0.20 | 0.21 | 0.17 |
| Component 1:component 2 (weight ratio) | | Component 1 only | 7:3 | 6:4 | 5:5 | 3:1 |
| Film-forming film | | Film 12 | Film 13 | Film 14 | Film 15 | Film 16 |
| Glass transition temperature (Tg) | | 173 | 221 | 220 | 220 | 207 |

TABLE 1-continued

|  |  |  |  |  |  |  |
|---|---|---|---|---|---|---|
| Number average molecular weight (Mn) | *2) | 194,000 | 198,000 | 196,000 | 70,000 |
| Weight average molecular weight (Mw) | *2) | 232,000 | 230,000 | 235,000 | 156,000 |
| Stretching conditions | Ratio (%) | 50 | 100 | 100 | 100 | 60 |
| | Temperature (° C.) | 183 | 241 | 240 | 230 | 227 |
| Stretched film | Thickness (μm) | 32 | 32 | 35 | 38 | 49 |
| | Re (550) (nm) | 138 | 138 | 138 | 138 | 142 |
| | Re (450)/Re (550) | 0.94 | 0.87 | 0.85 | 0.82 | 0.87 |
| | K (×10$^{-12}$ m$^2$/N) | 32.0 | 12.1 | 12.8 | 13.5 | 18.0 |
| | Haze (%) | 5.63 | 0.98 | 1.05 | 1.27 | 0.90 |

TABLE 2

|  |  | Comparative Example 1 | Comparative Example 2 | Comparative Example 3 | Comparative Example 4 | Comparative Example 5 |
|---|---|---|---|---|---|---|
| Component 1 | Cellulose derivative | Derivative 13 | Derivative 14 | Derivative 15 | Derivative 16 | Derivative 13 |
| | Silyl group | — | — | — | — | — |
| | Aliphatic group | Ethyl | Ethyl | — | — | Ethyl |
| | Acyl group 1 | 2-naphthoyl | 2-naphthoyl | Benzoyl | n-butanoyl | 2-naphthoyl |
| | Acyl group 2 | — | — | — | Acetyl | — |
| | D1 | 2.60 | 2.37 | — | — | 2.60 |
| | D2 | 0.40 | 0.62 | 2.17 | 2.70 *4) | 0.40 |
| | D1 + D2 | 3.00 | 2.99 | 2.17 | 2.70 | 3.00 |
| Component 2 | Cellulose derivative | — | — | — | — | Derivative 14 |
| | Silyl group | — | — | — | — | — |
| | Aliphatic group | — | — | — | — | Ethyl |
| | Acyl group 1 | — | — | — | — | 2-naphthoyl |
| | Acyl group 2 | — | — | — | — | — |
| | D1 | — | — | — | — | 2.37 |
| | D2 | — | — | — | — | 0.62 |
| | D1 + D2 | — | — | — | — | 2.99 |
| Acyl group total substitution degree D3 | | 0.40 | 0.62 | 2.17 | 2.70 | 0.42 |
| Component 1:component 2 (weight ratio) | | Component 1 only | Component 1 only | Component 1 only | Component 1 only | 9:1 |
| Film-forming film | | Film 17 | Film 18 | Film 19 | Film 20 | Film 21 |
| Glass transition temperature (Tg) | | 145 | 145 | 170 | 141 | 145 |
| Number average molecular weight (Mn) | | 56,000 | 62,000 | *3) | 70,000 | 56,000 |
| Weight average molecular weight (Mw) | | 496,000 | 560,000 | *3) | 155,000 | 496,000 |
| Stretching conditions | Ratio (%) | 50 | 50 | 50 | 50 | 50 |
| | Temperature (° C.) | 155 | 155 | 200 | 151 | 155 |
| Stretched film | Thickness (μm) | 45 | 39 | 59 | 131 | 40 |
| | Re (550) (nm) | 160 | −46 | −26 | 138 | 160 |
| | Re (450)/Re (550) | 0.89 | 1.71 | 1.09 | 0.89 | 0.86 |
| | K (×10$^{-12}$ m$^2$/N) | 40.0 | 62.0 | Not measurable | 16.0 | 46.4 |
| | Haze (%) | 1.95 | 2.68 | Whitening | 2.48 | 2.12 |
|  |  | Comparative Example 6 | Comparative Example 7 | Reference Example 1 | Reference Example 2 |
| Component 1 | Cellulose derivative | Derivative 13 | Derivative 13 | Derivative 1 | Derivative 1 |
| | Silyl group | — | — | TBDMS | TBDMS |
| | Aliphatic group | Ethyl | Ethyl | — | — |

TABLE 2-continued

| | | | | | |
|---|---|---|---|---|---|
| | Acyl group 1 | 2-naphthoyl | 2-naphthoyl | 2-naphthoyl | 2-naphthoyl |
| | Acyl group 2 | — | — | — | — |
| | D1 | 2.60 | 2.60 | 1.58 | 1.58 |
| | D2 | 0.40 | 0.40 | 0.20 | 0.20 |
| | D1 + D2 | 3.00 | 2.60 | 1.78 | 1.78 |
| Component 2 | Cellulose derivative | Derivative 14 | Derivative 14 | — | — |
| | Silyl group | — | — | — | — |
| | Aliphatic group | Ethyl | Ethyl | — | — |
| | Acyl group 1 | 2-naphthoyl | 2-naphthoyl | — | — |
| | Acyl group 2 | — | — | — | — |
| | D1 | 2.37 | 2.37 | — | — |
| | D2 | 0.62 | 0.62 | — | — |
| | D1 + D2 | 2.99 | 2.99 | — | — |
| Acyl group total substitution degree D3 | | 0.44 | 0.46 | 0.20 | 0.20 |
| Component 1:component 2 (weight ratio) | | 8:2 | 7:3 | Component 1 only | Component 1 only |
| Film-forming film | | Film 22 | Film 23 | Film 1 | Film 1 |
| Glass transition temperature (Tg) | | 145 | 145 | 219 | 219 |
| Number average molecular weight (Mn) | | 60,000 | 67,000 | 196,000 | 196,000 |
| Weight average molecular weight (Mw) | | 576,000 | 558,000 | 235,000 | 234,000 |
| Stretching conditions | Ratio (%) | 50 | 50 | 50 | 10 |
| | Temperature (° C.) | 155 | 155 | 199 | 229 |
| Stretched film | Thickness (μm) | 40 | 45 | 51 | 50 |
| | Re (550) (nm) | 144 | 141 | 136 | 28 |
| | Re (450)/Re (550) | 0.84 | 0.81 | 0.85 | 0.86 |
| | K (×10$^{-12}$ m$^2$/N) | 47.3 | 49.4 | 10.0 | 11.0 |
| | Haze (%) | 2.41 | 1.87 | 15.3 | 0.72 |

*1) Methyl substitution degree: 1.80, TBDMS substitution degree: 0.5
*2) Since product stability was poor, molecular weight measurement was not possible.
*3) Since it was insoluble in solvent, molecular weight measurement was not possible.
*4) n-butanoyl substitution degree: 1.70, acetyl substitution degree: 1.0

In Tables 1,2, TBDMS means a tertiary butyldimethylsilyl group; THDMS means a tertiary hexyldimethylsilyl group; TIPS means a triisopropylsilyl group; and TMS means a trimethylsilyl group.

From Table 1, the stretched films of Examples 1, 2, 7, 8, 10, 11, 13-16 satisfy all of optical characteristics including a suitable in-plane retardation (130-160 nm), a suitable reverse wavelength dispersion (0.50-0.99) and a suitable photoelastic coefficient ($5 \times 10^{-12}$-$30 \times 10^{-12}$ m$^2$/N). In addition, the stretched films of Examples 1, 2, 7, 8, 10, 11, 13-16 also satisfy a suitable haze (2.00% or less) and thus can be evaluated as being highly transparent. Further, the stretched films of Examples 1, 2, 7, 8, 10, 11, 13-16 also satisfy suitable heat resistance (Tg>180° C.) and thus are also high in heat resistance. The stretched films of Examples 1, 2, 7, 8, 10, 11, 13-16 also each have a thickness of 50 μm or less, which is sufficiently thin.

For the stretched films of Examples 3-6, the in-plane retardation was outside the above-described range, but other properties were within the suitable ranges. For the stretched film of Example 9, the photoelastic coefficient was outside the above-described range, but other properties were within the suitable ranges. Therefore, the stretched films of Examples 3-6, 9 have favorable properties conforming to the stretched films of Examples 1, 2, 7, 8, 10, 11, 13-16.

Further, for the stretched film of Example 12, the thickness, the in-plane retardation and the reverse wavelength dispersion were within the suitable ranges and thus has properties conforming to the stretched films of Examples 3-6, 9.

In contrast, for the stretched films of Comparative Examples 1-7, and for the stretched films of Reference Examples 1, 2, which were obtained by varying the stretching temperature or the stretch ratio, various physical properties are in a trade-off relationship.

The present invention is not limited to the above-described embodiments. Various modifications are possible within the scope of the claims. Embodiments obtained by appropriately combining technical means respectively disclosed in different embodiments and Examples are also included in the technical scope of the present invention. Further, by combining technical means that are respectively disclosed in the embodiments and Examples, new technical features can be formed.

INDUSTRIAL APPLICABILITY

The present invention can be applied to a polymer material for a transparent film applicable as a component of various electronic devices and to an image display apparatus such as liquid crystal display apparatus or an organic EL using the transparent film as a structural element.

What is claimed is:

1. A polymer material, comprising:
at least one cellulose derivative having the following formula (1):

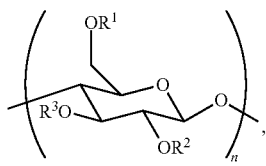

Formula (1)

wherein $R^1$, $R^2$, and $R^3$ are each independently selected from the group consisting of i) a hydrogen atom, ii) an organosilyl group having at least one selected from the group consisting of a tertiary butyl group, a tertiary hexyl group, an isopropyl group, an isobutyl group, a phenyl group, and a naphthyl group, iii) an acyl group, and iv) a second aliphatic group, provided that the at least one cellulose derivative comprises (a) the organosilyl group and (b) an aromatic acyl group, and
n is a positive integer.

2. The polymer material according to claim 1, wherein the organosilyl group or the second aliphatic group in each of the at least one cellulose derivative has a substitution degree $D_1$ of from 1.00 to 2.40,
the acyl group in each of the at least one cellulose derivative has a substitution degree $D_2$ of from 0.10 to 2.00,
the acyl group in the polymer material has a total substitution degree $D_3$ of from 0.10 to 2.00, and
$D_1$ and $D_2$ satisfy $D_1+D_2 \leq 3.0$.

3. The polymer material according to claim 1, wherein the at least one cellulose derivative comprises a plurality of organosilyl groups, and at least one of the organosilyl groups is a trisubstituted organosilyl group.

4. The polymer material according to claim 1, wherein each of the at least one cellulose derivative comprises a plurality of organosilyl groups, and at least one of the organosilyl groups has at least one selected from the group consisting of a tertiary butyl group, a tertiary hexyl group, and an isopropyl group.

5. The polymer material according to claim 1, wherein the polymer material has a glass transition temperature (Tg) of 180° C. or higher.

6. The polymer material according to claim 1, wherein each of the at least one cellulose derivative comprises a plurality of acyl groups, and at least one of the acyl groups is an acyl group having a 1-naphthoyl group or a 2-naphthoyl group.

7. The polymer material according to claim 1, wherein each of the at least one cellulose derivative comprises a plurality of acyl groups, and at least one of the acyl groups is an acyl group having a 2-naphthoyl group.

8. A film, comprising:
the polymer material of claim 1.

9. The film according to claim 8, wherein the film has an in-plane retardation Re (550) of from 130 to 160 nm and a film thickness of 50 μm or less.

10. The film according to claim 8, wherein the film has a reverse wavelength dispersion (Re (450) Re (550)) of from 0.50 to 0.99.

11. The film according to claim 8, wherein the film has a photoelastic coefficient (K) of from $5\times10^{-12}$ to $30\times10^{-12}$ m²/N.

12. A circular polarizing plate, comprising:
at least one sheet of the film of claim 8.

13. An image display apparatus, comprising:
the circular polarizing plate of claim 12.

14. A method of manufacturing the film according to claim 8, the method comprising:
stretching a film comprising the polymer material at a temperature of from (Tg−10) to (Tg+30) ° C., wherein Tg is a glass transition temperature of the film comprising the polymer material.

15. The method according to claim 14, wherein the stretching of the film is conducted at a stretch ratio of 20-200%.

16. A polymer material, comprising:
at least one cellulose derivative having the following formula (1):

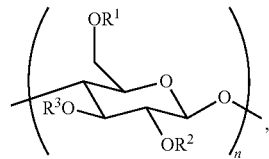

Formula (1)

where R1, R2 and R3 are each independently selected from the group consisting of i) a hydrogen atom, ii) an organosilyl group having a first aliphatic group, an unsaturated aliphatic group or an aromatic group, iii) an acyl group and iv) a second aliphatic group, provided that the last one cellulose derivative comprises (a) the organosilyl group and (b) a plurality of acyl groups, wherein at least one of the plurality of acyl groups is an acyl group having a 1-naphthoyl group or a 2-naphthoyl group, and
n is a positive integer.

17. A film, comprising:
the polymer material of claim 16.

18. A circular polarizing plate, comprising:
at least one sheet of the film of claim 17.

19. An image display apparatus, comprising:
the circular polarizing plate of claim 18.

20. A method of manufacturing the film according to claim 17, the method comprising:
stretching a film comprising the polymer material at a temperature of from (Tg−10) to (Tg+30) ° C., wherein Tg is a glass transition temperature of the film comprising the polymer material.

* * * * *